United States Patent [19]
Hassenboehler, Jr. et al.

[11] Patent Number: 5,747,394
[45] Date of Patent: May 5, 1998

[54] POST-TREATMENT OF LAMINATED NONWOVEN CELLULOSIC FIBER WEBS

[75] Inventors: Charles B. Hassenboehler, Jr.; Larry C. Wadsworth, both of Knoxville, Tenn.

[73] Assignee: The University of Tennessee Research Corporation, Knoxville, Tenn.

[21] Appl. No.: 515,244

[22] Filed: Aug. 15, 1995

Related U.S. Application Data

[63] Continuation of Ser. No. 218,984, Mar. 28, 1994, Pat. No. 5,441,550, which is a continuation of Ser. No. 37,228, Mar. 26, 1993, abandoned, which is a continuation-in-part of Ser. No. 858,182, Mar. 26, 1992, Pat. No. 5,244,482.

[51] Int. Cl.⁶ .................................................... D04H 3/08
[52] U.S. Cl. ................... 442/328; 442/409; 442/400; 442/401; 428/114; 428/910; 428/311.11; 428/311.51
[58] Field of Search ....................... 428/114, 910, 428/311.11, 311.51; 442/328, 409, 400, 401

[56] References Cited

U.S. PATENT DOCUMENTS

| | | | |
|---|---|---|---|
| Re. 35,206 | 4/1996 | Hassenboehler, Jr. | 55/528 |
| 2,612,966 | 10/1952 | Nicol . | |
| 2,740,184 | 4/1956 | Thomas . | |
| 4,041,203 | 8/1977 | Brock et al. . | |
| 4,048,364 | 9/1977 | Harding et al. . | |
| 4,088,731 | 5/1978 | Groome . | |
| 4,215,682 | 8/1980 | Kubik et al. . | |
| 4,225,642 | 9/1980 | Hirakawa . | |
| 4,296,163 | 10/1981 | Emi et al. . | |
| 4,298,649 | 11/1981 | Meitner . | |
| 4,302,495 | 11/1981 | Marra . | |
| 4,355,066 | 10/1982 | Newman . | |
| 4,375,718 | 3/1983 | Wadsworth et al. . | |
| 4,379,192 | 4/1983 | Wahlquist et al. . | |
| 4,588,537 | 5/1986 | Klaase et al. . | |
| 4,592,815 | 6/1986 | Nakaro . | |
| 4,824,451 | 4/1989 | Vogt et al. . | |
| 4,874,399 | 10/1989 | Reed . | |
| 4,874,659 | 10/1989 | Ando et al. . | |
| 4,902,306 | 2/1990 | Burnett et al. . | |
| 4,904,174 | 2/1990 | Moosmayer et al. . | |
| 4,917,942 | 4/1990 | Winters . | |
| 4,950,531 | 8/1990 | Radwanski . | |
| 4,961,974 | 10/1990 | Jones . | |
| 4,965,122 | 10/1990 | Morman . | |
| 4,970,104 | 11/1990 | Radwanski . | |
| 4,981,747 | 1/1991 | Morman . | |
| 5,037,455 | 8/1991 | Scheineson et al. . | |
| 5,053,066 | 10/1991 | Hassenboehler . | |
| 5,057,710 | 10/1991 | Nishiura et al. | 307/400 |
| 5,122,048 | 6/1992 | Deeds . | |
| 5,226,992 | 7/1993 | Morman . | |
| 5,244,482 | 9/1993 | Hassenboehler . | |
| 5,443,606 | 8/1995 | Hassenboehler, Jr. | 55/486 |
| 5,486,411 | 1/1996 | Hassenboehler, Jr. | 428/286 |

FOREIGN PATENT DOCUMENTS

| | | |
|---|---|---|
| 59-145013 | 8/1984 | Japan . |
| 1347176 | 2/1974 | United Kingdom . |

*Primary Examiner*—Kathleen Choi
*Attorney, Agent, or Firm*—Weiser & Associates, P.C

[57] ABSTRACT

Nonwoven webs consolidated and elastic transverse direction, laminates and methods of making same are disclosed.

28 Claims, 8 Drawing Sheets

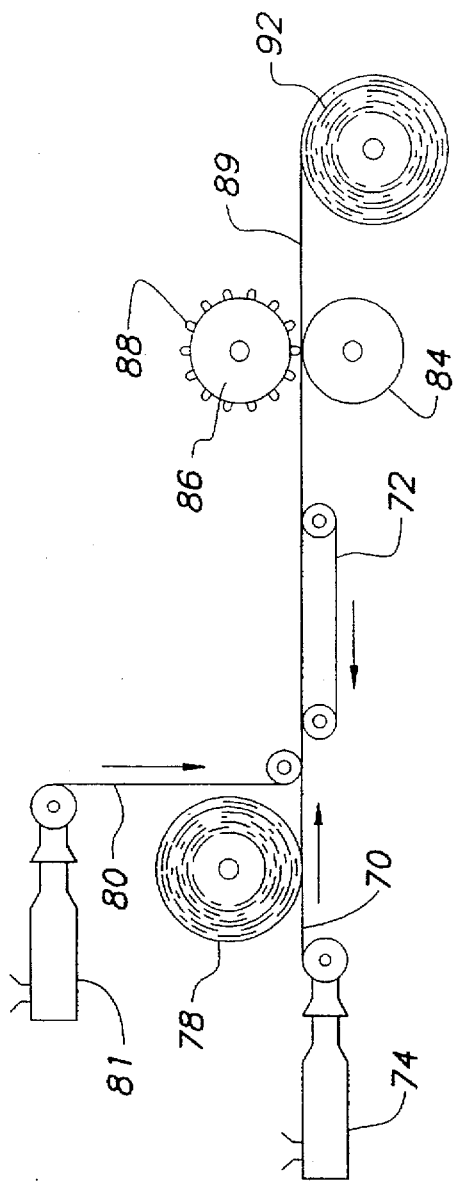
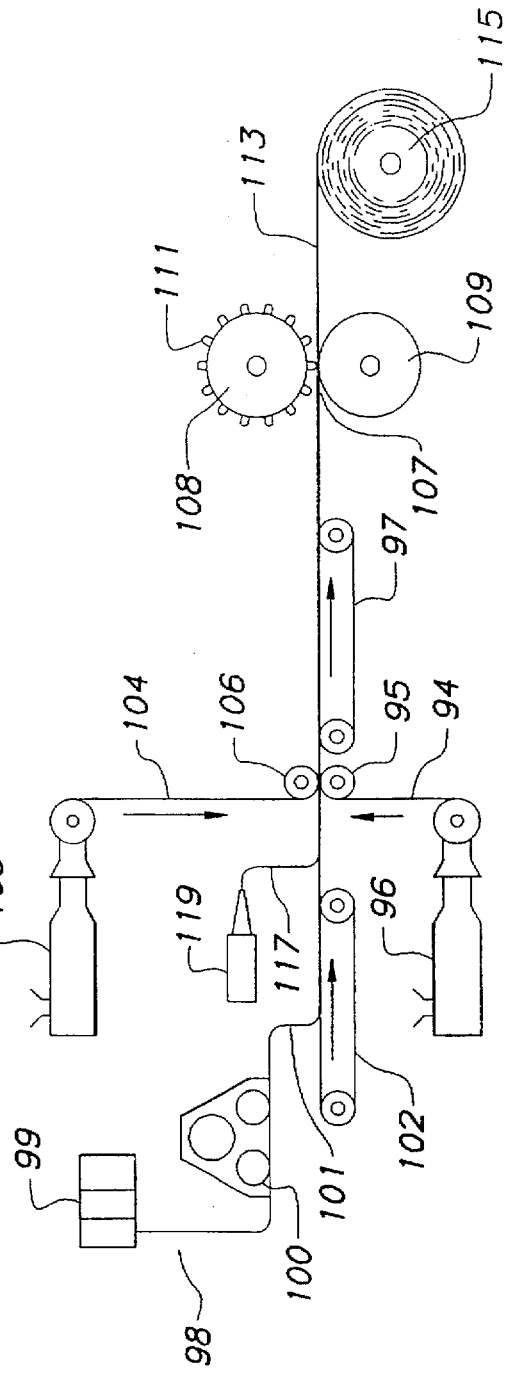
FIG. 12
FIG. 13

5,747,394

POST-TREATMENT OF LAMINATED NONWOVEN CELLULOSIC FIBER WEBS

This is a continuation application of Ser. No. 08/218,984 filed Mar. 28, 1994, now U.S. Pat. No. 5,441,550, which is a continuation application of 08/037,228 filed Mar. 26, 1993, now abandoned, which in turn is a continuation-in-part of application Ser. No. 07/858,182, filed Mar. 26, 1992, now U.S. Pat. No. 5,244,482.

FIELD OF THE INVENTION

This invention relates generally to laminated webs made up of at least one inner layer of cellulosic material sandwiched between outer nonwoven layers, which webs have been post-treated to reduce the pore size in the web and/or to impart other desirable properties to the web. In one aspect, the invention relates to post-treatment of a laminated precursor web to improve the web's properties for a variety of uses. In another aspect of the invention, nonwoven webs of man-made thermoplastic fibers are firstly laminated with at least one inner layer of cellulosic fibers, secondly drawn under thermal conditions, and thirdly mechanically compacted to efficiently alter the geometric arrangement of the fibers making up the web resulting in web having reduced measures of pore size and/or other desirable properties.

BACKGROUND OF THE INVENTION

As indicated above, the present invention relates to the post-treatment of laminated webs which include outer nonwoven non-elastomeric layers between which there is sandwiched a layer of cellulosic fibers to alter the filament spacing and structure of at least the nonwoven non-elastomeric webs. The terms, "web" and "layer" are used herein interchangeably at times, the distinction therebetween being obvious from the context in which the terms are used. In either event, "web" and "layer" imply a self-supporting planar member formed of fibers or filaments as the case may be. It should be also observed that the terms "filaments" or "fibers" are used interchangeably herein, although "fibers" in nonwovens generally refers to discontinuous strands and "filaments" as continuous strands. The present invention contemplates webs with continuous synthetic thermoplastic filaments and/or discontinuous fibers in the non-elastomeric nonwoven layers of man-made fibers.

In the present invention, a precursor web made up of an inner layer of staple-length cellulosic fibers which is sandwiched between outer layers of man-made fibers, i.e. synthetic, thermoplastic, nonelastomeric fibers, is consolidated by heating and drawing in the machine direction (MD) to provide a consolidated web which has reduced measures of pore size and enhanced breathability, strength, hand, absorbent capacity, wicking and barrier properties. The layers of man-made fibers preferably are formed by meltblowing or spunbonding techniques. Meltblown fibers of these man-made fibers preferably are of a diameter of between about 0.5 and about 10.0 micrometers; whereas, the diameters of the fibers in spunbond webs overlap with meltblown webs on the low end at about 8.0 micrometers and may range up to 50 micrometers or more on the upper end of their diameter range. Spunbond webs generally are coarser but stronger than meltblown webs because spunbond fibers are given notable orientation after quenching. In either instance, the fibers are formed into self-sustaining webs. The preferred web weight of a meltblown web for use in the present invention is light weight, having a weight in the range of between about 0.05 and about 10 oz/yd$^2$, and most preferably between about 0.25 and about 2 oz/yd$^2$. The preferred weight of a spunbonded web for use in the present invention is also light weight having a weight between about 0.1 and about 10 oz/yd$^2$, and most preferably between about 0.3 and about 2 oz/yd$^2$. Webs of weights lighter than about 0.05 oz/yd$^2$ tend to be of insufficient fiber density for containing the cellulosic fibers and providing the strength and other properties desired in the composite web. The heavier weight webs, i.e. above about 10 oz/yd$^2$ tend to develop undesirably harsh composite webs when combined with the cellulosic fiber layer. More specific descriptions of the spunbonding and meltblowing processes, and the webs so produced are given in the publication entitled: "Proceedings, Fiber Producer Conference 1983", Apr. 12, 13 & 14, 1983, pp. 6-1 through 6-11, such publication being incorporated herein by reference.

Since the development of the meltblowing process by the Naval Research Laboratory in 1951 (published in 1954 by the U.S. Department of Commerce in an article entitled "MANUFACTURE OF SUPERFINE ORGANIC FIBERS"), which publication is incorporated herein by reference, there has been a considerable effort by several companies operating in the industry to find new uses for the nonwoven product having microsized fibers. Because of the random, geometric assembly or structure of the fibers, and relatively small fiber size, the fibers have received extensive use as filters. Further and/or different uses of these meltblown webs is desired.

In the formation process for most random laid or unordered fibrous webs, the pore size that develops is directly related to the square of the fiber diameter. The spunbonded process is distinguished from meltblowing by self-bonding and non uniform draw down (plastic deformation) of filaments forming the web. Thus meltblown webs have a relatively broad distribution of fiber diameters. Typical nonwoven webs produced by meltblowing have fiber diameters of 0.5 to 20 microns, preferably 0.5 to 8 microns, making them suitable for filtering out 5 micron particles at 80 percent efficiency or greater. It is known that filtration can be improved by practicing the web formation process to produce smaller and smaller diameter fibers while controlling other formation parameters such as porosity and thickness. As noted above, this results in smaller pore size thereby improving the efficiency of particle removal in filtration. By operating the meltblowing process under extreme conditions, the fiber size can be produced in the order of 0.1 to 5 microns. The process, however, has the following disadvantages: low production rates, high energy usage. In order to improve the properties of the nonwoven web, efforts have been made to post-treat the webs by a variety of processes. Such efforts have included post calendering the web to improve, the tensile strength of the web, and post electrification as disclosed in U.S. Pat. No. 4,592,815 to improve filtration performance of the web, to name but two of such efforts. It is significant to note that none of these prior art techniques have been directed specifically at planar consolidation to reduce the size of the pores in the web. Neither is it known to attempt consolidation of laminates of these webs, particularly when laminated with disparate fibrous layers such as layers of cellulosic fibers.

Calendering of nonwovens flattens fibers and consolidates the web in a direction normal to the plane of the web and reduces the thickness. This, however, leads to reduction in permeability which is an important property to conserve for many purposes such as breathability and filtration. U.S. Pat. No. 4,048,364 discloses a process for drawing the meltblown web in the machine direction (MD) to produce a ten-fold increase in the tensile strength of the post-drawn web. It is significant to note, however, that the precursor web required in this invention contains relatively coarse fibers (10 to about 40 microns average fiber diameter) and polymer of low crystallinity. Low crystallinity generally means about 22% or less. The extensive drawing of the web reduces the diameter of the fibers in the machine direction to an average diameter of 1 to 8 microns at draw ratios ranging from 2:1 to 10:1 and preferably 5:1 to 7:1. The main purpose of the process is to increase the molecular orientation to enhance the strength of the greatly drawn fibers. Precursor webs of very high post processing draw ratio capability are required in order to prevent rupture of fibers in the web drawing process. Tests have shown that the stretching of a precursor web having hot (e.g., 10° F. less than the melting point of the precursor web) drawing capabilities from about 5:1 to 10:1 does not alter the measure of pore size of the web. This is probably due to the fact that the high and easy drawability of the fibers prevents the development of sufficient, compressive forces to bend the stout fibers in the web and physically reduce its pore dimensions and measures of pore size distribution in general.

Nonwoven webs (fabrics) are defined as "sheet or web structures made by bonding and/or interlocking fibers, yarns or filaments by mechanical, thermal, chemical or solvent means." These webs do not require the conversion of fibers to yarn. Nonwoven webs are also called bonded or engineered webs and are manufactured by processes other than spinning, weaving or knitting, hence the name "nonwovens". The fibers of a nonwoven web are substantially randomly laid to form a web wherein some of the fibers are bonded by fiber-to-fiber fusion, or fiber entanglement, or thermal bonds as by point bonding. The basic structure of all nonwovens is a web of fibers or filaments. A single type of fiber or filament may be the basic element of a nonwoven. Fibers that are measured in a few centimeters or inches or fractions thereof are called staple fibers. Those fibers of extreme length are called filament fibers. In general filament fibers are measured in terms of kilometers or miles. In fact, filament fibers are not readily measured, as they may be many, many kilometers in length. In fibers, the length must be considerably greater than the diameter, e.g., a length-to-width (diameter) ratio of at least 100 and usually considerably higher. Cotton fibers may measure from less than ½ inch to more than 2 inches in length and have a typical length-to-diameter ratio of about 1400. Other natural fibers exhibit typical ratios as follows: flax-1200; ramie-3000; and wool-3000. In the present application, the terms "fiber" or "fibers" are intended to include both short and long fibers, i.e. staple fibers and filament fibers, unless otherwise specifically indicated by identifying the fibers as staple or filament. For example, spunbonded webs are formed of filament fibers, whereas meltblown webs include an assortment of fiber lengths so that these webs commonly include both staple length and filament length fibers. In nonwovens, the individual fibers may be in an organized or in a random arrangement. Tensile, elongation, and hand properties are imparted to the web by the type or types of bonding as well as fiber-to-fiber cohesion and reinforcement by its constituents. The technology for making nonwoven webs is based on the following primary elements: fibers of various lengths and diameters; a web arranged according to the method of forming and processing; the bonding of fibers within the web and reinforcement by its constituents. The variation of one or several elements in combination allows for the enormous range of nonwoven fiber types. Control of the type and length of the fibers and of the bonding, in combination with the selection of the manufacturing method, gives rise to a highly technical, yet extremely flexible combination of options.

Nonwoven webs of man-made, i.e. synthetic polymeric, fibers (as distinguished from "natural" fibers such as cotton, ramie, wool, etc.) have heretofore found acceptance in the medical industry as disposable substitutes for the prior art reusable cotton examination gowns, surgical gowns, surgical drapes, face masks, shoe covers, sterilization wrap and other products, to the extent that this market for nonwoven products is estimated to exceed one billion dollars annually. Further, nonwoven webs have found use in sanitary products, such as sanitary napkins, disposable diapers, incontinent pads and other similar products. One of the benefits of nonwoven webs heretofore has been their relatively low cost, as compared to woven webs. The difference in cost between nonwoven and woven webs has heretofore been of a magnitude such that the end users can dispose of the nonwoven web product after a single use and yet realize a monetary gain over the multi-use woven webs.

Among the desired properties of a nonwoven web for use in medical and sanitary applications are the hand (softness and drapability), wicking, liquid retention, absorptive capacity and strength of the web. Also of importance in acceptance of the nonwoven web by the end user is the degree to which the nonwoven web approximates the desirable properties of the woven webs, in particularly woven cotton webs. Nonwoven webs of man-made fibers generally have the reputation of notoriously lacking many of the properties of woven natural-fiber webs, in particular hand, wicking, and liquid absorption and retention. Meltblown nonwoven webs, for example, exhibit a void volume of about 85%; spunbonded nonwoven webs exhibit a void volume of between about 90 and 95%. These webs, further, often exhibit undesirable chemical properties, such as hydrophobicity, that make the webs less than desirable for use in medical applications, for example. Moreover, the surface properties of these nonwoven webs tend to be smooth, hence exhibit a slick or oily feel and appearance. The man-made fibrous material of the prior art nonwoven webs most commonly exhibits a low surface tension so that aqueous liquids are not attracted thereto so that these prior art webs have poor wicking and retention of these liquids. These webs also are difficult to treat with liquid repellents. Still further, the filamentary nature of the man-made fibers of many prior art webs and their methods of manufacture cause the fibers to lay in the webs with the length dimension of the fibers oriented substantially parallel to the plane of the web so that the webs have poor absorbency of liquids into the body of the web. Considerable effort has been exerted heretofore to improve these properties of nonwoven webs, including modification of the manner of manufacturing and/or processing the web. These efforts, however, increase the cost of the nonwoven web and may adversely alter its monetary advantage over woven webs of natural fibers. Further, the man-made fibers of nonwoven webs most commonly are petroleum-based and therefore have been subject to the substantial fluctuations in market price of this raw material, and the important considerations in ultimate disposal of the product after use.

SUMMARY OF THE INVENTION

It has also been surprisingly been discovered that by selecting a precursor laminated nonwoven web with certain properties and post-drawing the web under certain conditions, at least the synthetic man-made fibers of the precursor web are restructured to provide the laminated web with unique measures of pore size, directional absorption, elastic recovery properties, strength, wicking, liquid absorption capacity, breathability and barrier properties, as well as good drape and hand which make them ideally suited for a variety of end use applications such as protective apparel, face masks, diapers or sanitary napkin parts, wound dressings, respirators, wipes, chemical reservoirs, wicks, and surgical drapes.

In accordance with one aspect of the present invention there is provided a novel multilayered precursor web; all of the layers of which preferably are nonwoven, and which exhibits the desirable properties of a woven web of natural fibers and the economic advantages of a nonwoven web of man-made fibers. The precursor web of the present invention is multilayered and comprises a first layer of nonelastomeric, man-made fibrous material selected from the group consisting of thermoplastic meltblown man-made fibers, thermoplastic spunbonded man-made fibers, thermoplastic man-made staple fibers, and combinations thereof, this first layer being light weight and having a weight of between about 0.05 and about 10 oz/yd$^2$, and a second layer of cellulose-based natural staple fibers, excluding wood fibers, and having a weight of between about 0.1 and about 10 oz/yd$^2$, the fibers of the second layer having a fiber length of between about 0.5 and about 3.0 inches and a fineness of equivalent to between about 3 and 5 Micronaire units. In a preferred embodiment, the precursor web includes at least a third layer of nonelastomeric man-made fibrous material selected from the group consisting of thermoplastic meltblown man-made fibers, thermoplastic spunbonded man-made fibers, thermoplastic man-made staple fibers and combinations thereof. This third layer preferably also is light weight and has a weight of between about 0.05 and about 10 oz/yd$^2$, and is disposed on that side of the second layer opposite the first layer and thermally bonded to at least the second layer such that the second layer is sandwiched between the first and third layers. Other and additional like layers of like materials may be included in the laminate. The layers are preferably thermally bonded together to form a coherent web, the area of bonding between the layers being between about 5 and about 75% of the area of one of the flat surfaces of the laminated web. The bonding contemplated in the precursor web is of a type which does not adversely affect the hand and other physical characteristics of the product web such as liquid wicking and absorbent capacity. Accordingly, the preferred bonding is effected from only one side of the laminate.

The laminated precursor web of the present invention, regardless of the number of layers employed in its makeup, preferably exhibits a final composite weight of between about 0.5 and about 24 oz/yd$^2$ in order to approximate a woven web of natural fibers in feel, drapability and other properties. This limitation upon the present web requires that there be careful selection of the weight of each of the individual layers of the precursor web which will provide other desirable or required properties such as strength, wicking, liquid absorption and retention, and barrier properties (ability to exclude liquids while permitting or even encouraging vapor and gas transfer through the thickness of the web). This laminated precursor web is thereafter consolidated as described herein.

The method of the present invention involves subjecting the bonded layers of the precursor web, especially the layers of man-made thermoplastic fibers or filaments, which layers have relatively low tensile extensibility during post processing (as reflected by a low draw ratio at break), to primary drawing under an elevated temperature. This uni-directional drawing in the MD laterally consolidates the precursor web to a great extent thereby reducing both the average pore size of the web and narrowing the pore size distribution, as well as imparting to the web the further unexpected, but desirable properties of strength, wicking, liquid absorbent capacity, breathability and barrier properties. The resultant consolidated web exhibits improved uniformity in pore size and high lateral elasticity characteristic of "stretch fabric" having approximately 120% elongation to break. Further the resultant web, even though of improved breathability, exhibits good barrier properties, such as being resistant to strike-through of liquids by reason of the properties imparted to the consolidated web by the layer of natural staple fibers. Thus, the composite web of the present invention is particularly useful in the manufacture of disposable medical products because of its superior barrier properties, hand, breathability, strength, wicking and liquid absorption and retention, among other properties.

In an alternate embodiment, the web being drawn may be passed into supplemental mechanical compacting means to induce and/or refine the primary web consolidation.

Although the present invention is described and exemplified in connection with meltblown and spunbond webs, it is to be understood that it has application with other nonwovens of man-made fibers such as hydro-entangled, needled webs, and laminated combinations of these and with other web forms such as air laid, etc.

BRIEF DESCRIPTION OF THE DRAWINGS

FIG. 12 is a schematic representation of a further process for the manufacture of a laminated precursor web which incorporates various of the features of the present invention;

FIG. 13 is a schematic representation of a still further process for the manufacture of a laminated precursor web and depicting in-line web-forming apparatus;

DESCRIPTION OF THE PREFERRED EMBODIMENTS

As indicated above, the present invention relates to the post-treatment of a laminated precursor nonwoven web to reconstitute or restructure the fibers of the web, to reduce the measures of pore size and impart to the web other beneficial properties. The term "pore size" means a quantification of the physical dimensions of channels oriented in a generally normal direction to the plane of the web. The pore size values recited herein are based on standard test method ASTM F 316-86.

The present invention described with specific reference to the preferred webs will be meltblown webs; it is to be emphasized, however, that the method and product produced thereby includes other nonwoven webs of man-made fibers, specifically spunbond, hydro-entangled, needled webs and laminated combinations of these. Also the consolidated web produced according to the present invention may be used in combination with other webs or substrates such as webs from elastomeric polymers, microporous films or stretch limiting materials post laminated to limit the CD extensibility to less than 100% and provide additional performance properties for added utility.

Figure 1:
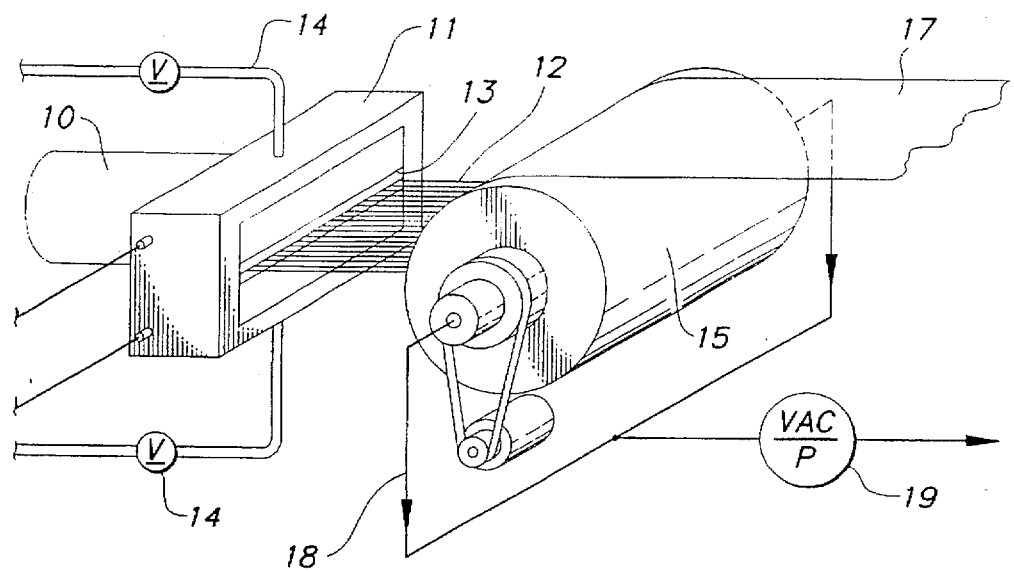
FIG. 1 is a perspective view of apparatus for producing meltblown webs.

Meltblowing is a well known process which generally utilizes equipment depicted in the schematic of FIG. 1. The process is carried out by introducing a thermoplastic resin into a extruder 10 where the polymer is heated, melted, and extruded through a die 11 to form a plurality of side-by-side filaments 12 while converging layers of hot air (discharging from slots 13 on each side of the row of filaments) contact the filaments and through drag forces stretch and attenuate the filaments 12 to a micron-size. The fibers 12 are collected onto a collector such as a rotating screen 15 forming a nonwoven web 17 which may be withdrawn on a take-up roller for later processing. The collector 15 may include a vacuum screen wherein a vacuum, through line 18, is drawn by a vacuum pump 19.

The hot air (primary jet air) is introduced into opposite sides of the die through line 14. Although not indicated on the drawing, secondary air which is aspirated into the primary air/fibrous stream serves to cool the filaments discharging from the die 11.

The process and apparatus described above forms no part of the present invention; however, variables used in the process, (including the type of resin employed, the amount and temperature of primary air and polymer melt, and the spacing of the collector 15 from the die discharge) will have a significant effect on the precursor web properties.

Briefly, the process in one embodiment of the present invention comprises the steps of (a) selecting a laminated nonwoven precursor web made up of multiple layers including at least one layer of staple-length cellulosic natural fibers sandwiched between at least two layers, at least one of which is made up of synthetic, thermoplastic nonelastomeric fibers or filaments, the layers being bonded into a coherent web suitable for consolidation in the manner described herein, the laminated precursor web having substantial fiber bonding and having relatively low processing extensibility, and (b) passing the nonwoven laminated precursor web through a heated zone to increase the temperature of the web to the softening temperature of one or more of the thermoplastic components thereof while drawing the web in the machine direction (MD) thereby greatly plastically bending the cross direction (CD) of synthetic thermoplastic fibers in the web which consolidates the web in the CD reducing the maximum pore size of the precursor web by at least 20 percent, and, more significantly, reducing the pore size distribution by at least 20% and imparting to the web enhanced strength, breathability, wicking, liquid absorption capacity and barrier properties. As described in detail below, the precursor web must have certain properties to enhance consolidation.

Figure 2:
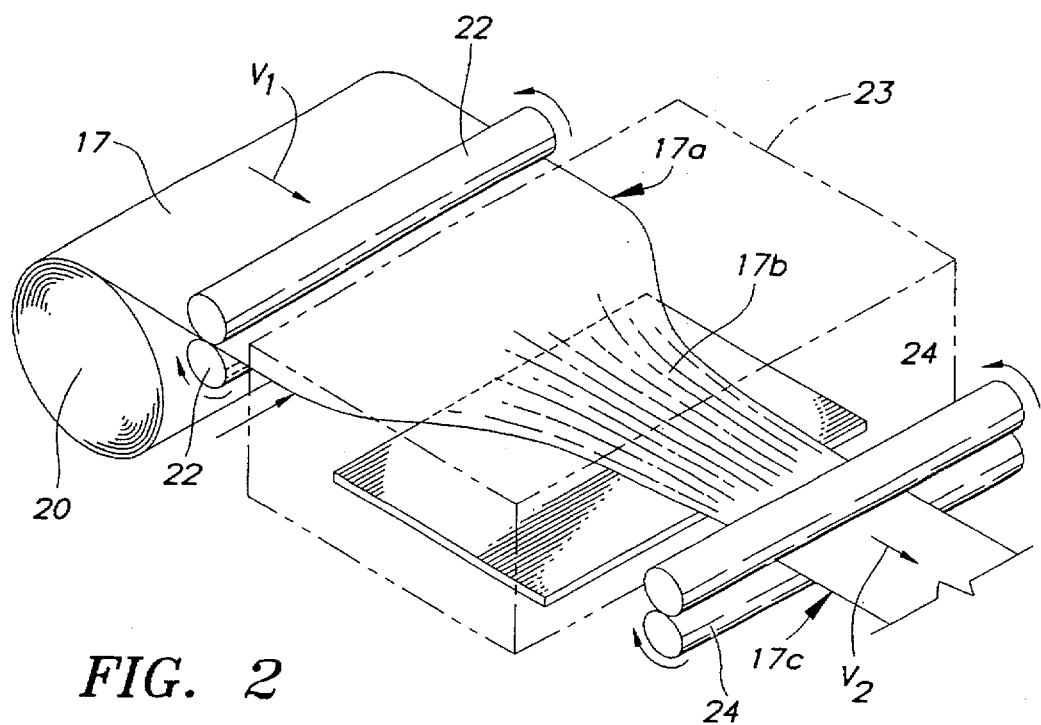
FIG. 2 is a perspective view of apparatus for the practice of web consolidation of the present invention.
Figure 6:
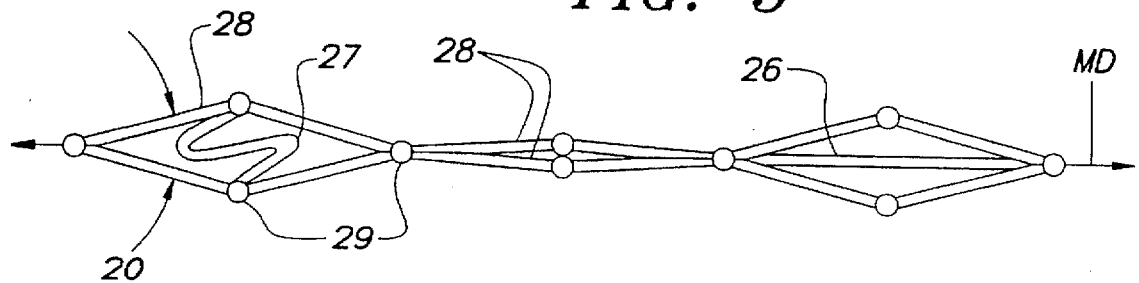
FIG. 6 is a view similar to FIG. 5 after the web had been drawn.
Figure 7:
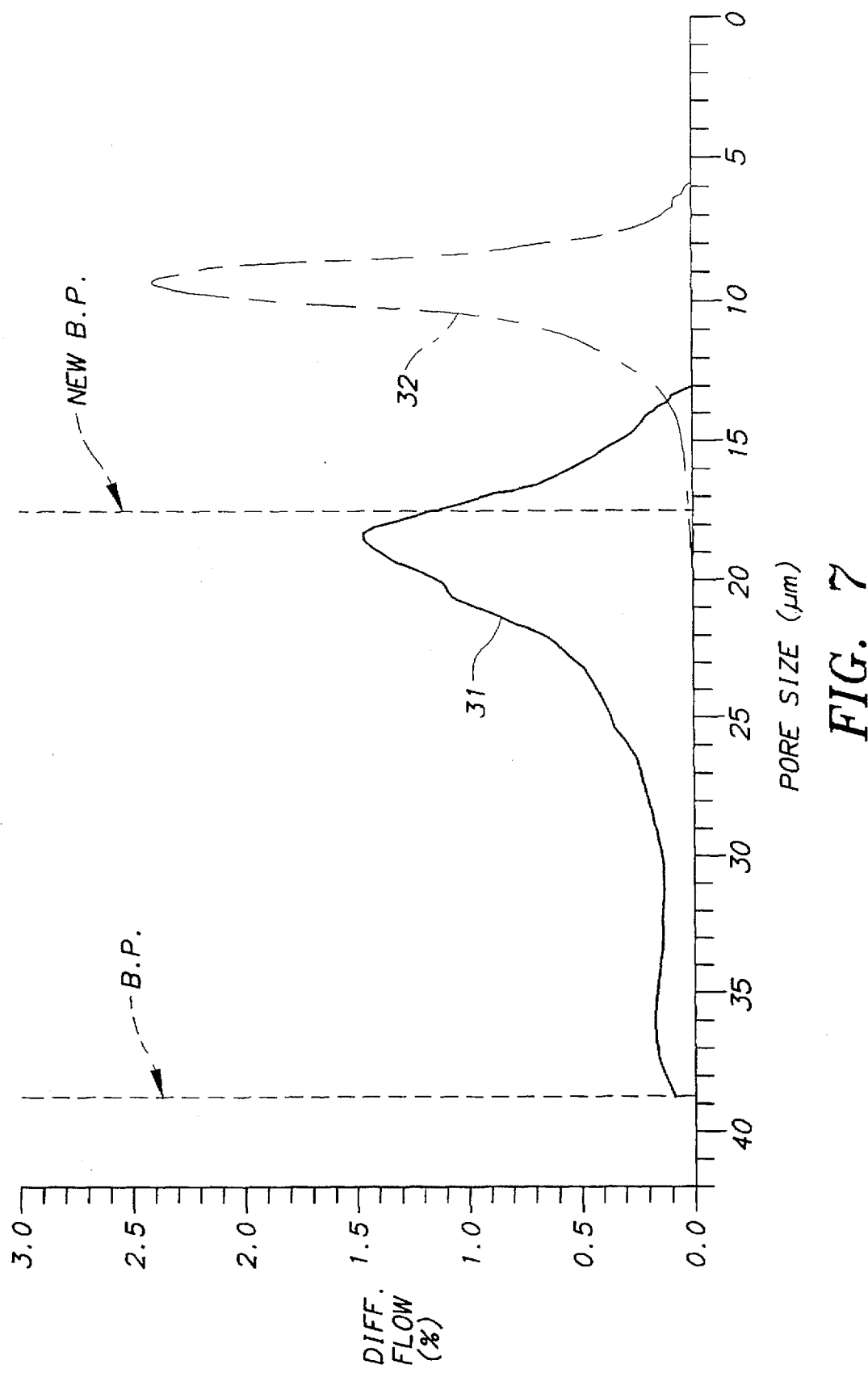
FIG. 7 presents two curves illustrating the pore size distribution of a layer of man-made fibers of a web before and after drawing.
Figure 8:
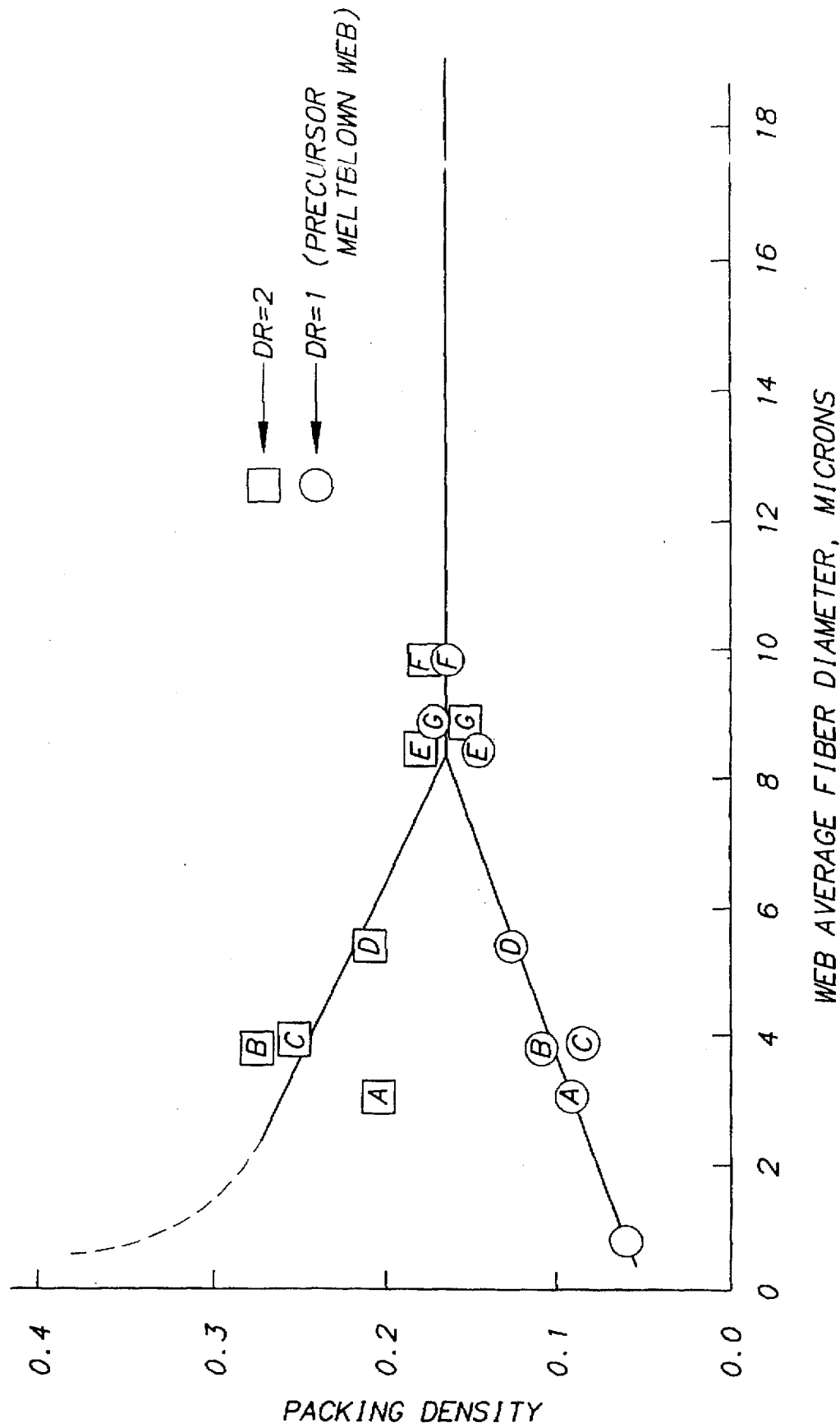
FIG. 8 is a plot illustrating that precursor meltblown webs (circles) having average fiber diameter less than eight microns (sample data from Table I and II) are increasingly densified by the post-drawing (squares).

Apparatus for carrying out a preferred consolidation process is illustrated schematically in FIG. 2 wherein the precursor web 17 is unwound from roll 20 and fed through the nip of counter-rotating feed rollers 22, through oven 23, and finally through the nip of counter-rotating rollers 24. The oven 23 is maintained at a temperature to heat the precursor web 17 to a temperature between its softening point and the melting point of the polymers in the web. Preferably the web is heated to a temperature within 10° to 15° F. of the melting point of at least one of the thermoplastic components of the web. The rotating rollers 24 are driven at a speed in excess of the rotating feed rollers 22 so that the output velocity (V2) of the web is in excess of the feed velocity (V1) for the draw ratio which is a function of the velocity ratio V2/V1. The initial drawing of the web 17 under thermal conditions causes the web to contract within the oven 23 from its feed width 17a as illustrated by web section 17b in FIG. 2. This contraction is due primarily to the plastic bending deformation by planar compression of generally CD thermoplastic fibers of the web thereby reducing the measures of pore size of the web. It is important to note that the high MD tensile forces developed at low MD strain during drawing, together with the network nature of the fiber-fiber bonds in the web augments the generation of enough compressive stress to easily bend most CD thermoplastic fiber segments 27 and compact the web in the CD as shown in FIG. 6. Since fiber bending rigidity of the thermoplastic fibers is related to the fourth power of the fiber diameter, only webs having small average fiber diameters can be consolidated by the available stresses with the associated reduction in pore size measures. Average fiber diameter for meltblown webs are preferably less than about 9 microns, and less than about 50 microns for spunbonded webs.

The lateral contraction which results in pore size reduction is not accompanied by significant average fiber diameter reduction of MD fibers. Continued web stretching beyond that necessary for web pore size reduction may cause fiber diameter reductions. The web is contracted to a minimum width 17c as the web 17 exits the oven 23 or as the web 17 passes the nip of rollers 24. It is preferred, but not essential, to cool or permit the web to cool between the exit of the oven 23 and the nip of the rollers 24 thereby controlling the heat set or annealing in the restructured fibers under stress.

As the web 17 cools to between 130° and 90° C. (for PP), the web can be electrostatically charged to impart durable enhanced filtration efficiency to the web products. (The nip of the rollers 24 and that of rollers 22 preferably are parallel so that the tensile force applied by rollers 24 and the resistance applied by rollers 22 are uni-directional [e.g., uniaxial]).

Figure 3:
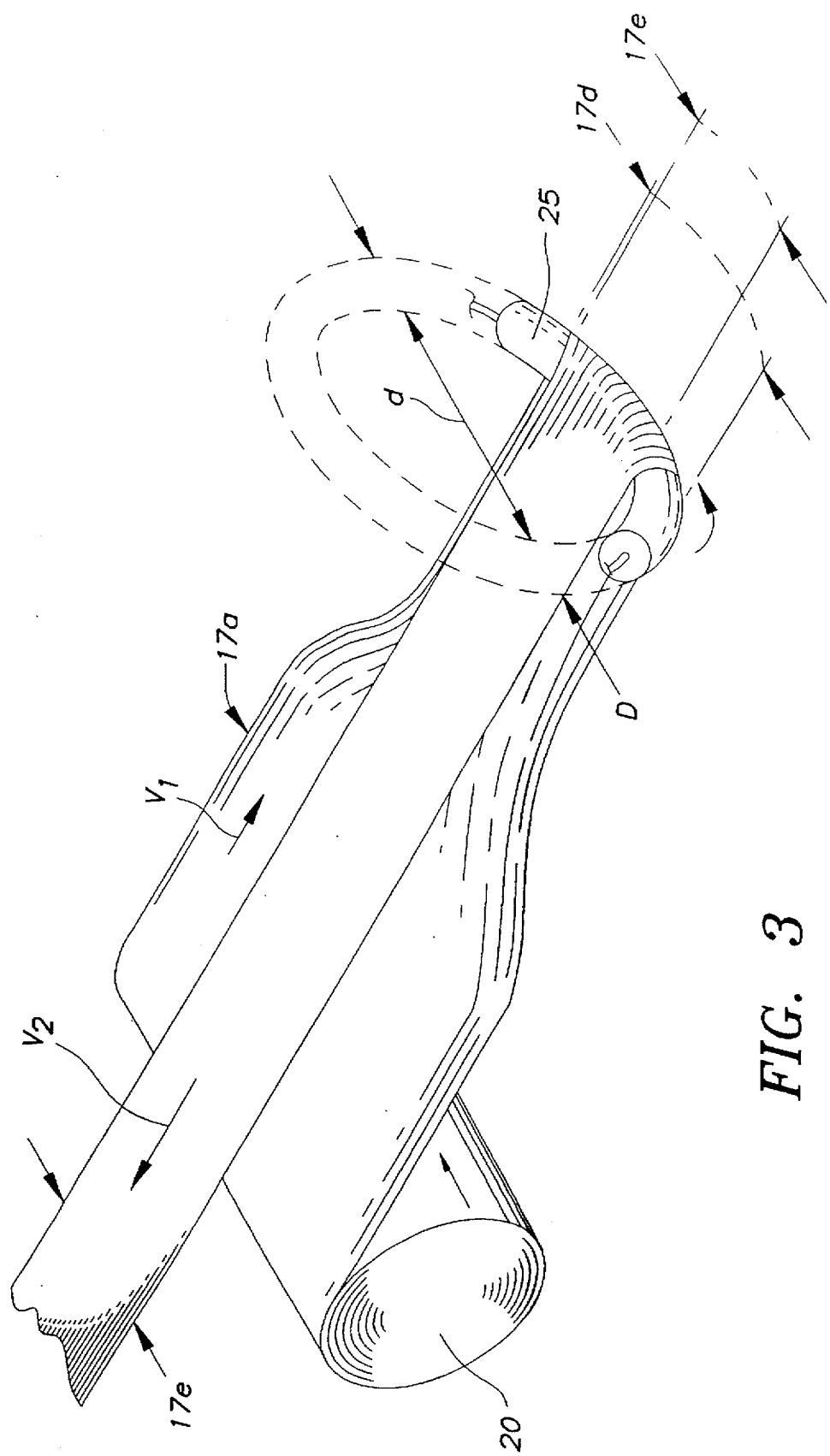
FIG. 3 is a perspective view of an alternate embodiment of an apparatus for the practice of web consolidation of the invention illustrating the drawn web passing over a torus surface for variably imparting compaction forces to the consolidating web.

To further control or narrow the distribution of pore sizes, supplementary or alternative web-width compaction means can be added between 17a and 17c as schematically illustrated in FIG. 3. FIG. 3 shows one alternate web processing embodiment in which the web passes into a supplementary or alternative web compacting device consisting of a (tilted) section of a torus 25. The consolidation interval of the web 17 and the torus bar 25 are heated in an oven or heated to provide the proper temperatures for drawing and consolidating the web. The web enters the outboard surface (of diameter D) of the torus at width dimension 17d and exits near the inboard surface of the torus which has a lesser width dimension 17e. The converging surface of the path around the torus applies transverse compressive forces in the plane of the web of entry width 17d. The added compressive forces overcome the bending resistance of inefficiently deformed large CD fiber segments or shot imperfections remaining in the web 17 following primary consolidation (if used). This improves the uniformity in pore sizes. The heating and stretching of the apparatus in FIG. 2 (gross drawing) and FIG. 3 (secondary drawing) can be carried out in series. The primary heating-drawing step imparts gross consolidation while the secondary torus consolidator refines the processing. The maximum compressive strain imparted to the web by traversing about 180° around the torus surface is given by (D-d)/D, where D is the outboard or entry perimeter related to the entry width 17d and d is the inboard or web exit perimeter of the torus 25. The magnitude of the supplementary consolidation can be adjusted by adjusting the two diameters of the torus 25 compacting device or "c-roll" shown in FIG. 3. If the c-roll is made straight (viz., radii=∞), then no lateral compaction occurs and the roll solely increases the anneal time and maintains the thickness of the web. The torus surface can be fixed or can be a rotatable curved flexible bar. A fixed torus 25 with an air bearing between the surface and the web allows high lateral compressive strain and low friction for additional MD draw. It should be noted that revolving "Bowed rolls" are only used in textile applications to remove wrinkles from a moving textile fabric by laterally stretching the fabric as the textile proceeds around a surface of diverging width.

The physical properties of the precursor web are basically determined by the layers of synthetic thermoplastic nonelastomeric man-made fibers. The layer of staple-length cellulosic natural fibers is of low strength, relative to the strength properties of the sandwiching layers of thermoplastic fibers, so that the contribution of the cellulosic layer to the physical properties such as the high MD tensile strength of the man-made fibers and the bending rigidity of the CD man-made fibers which are looked to in determining the acceptability of a precursor web for consolidation, is of essentially no effect. The nonelastomeric nonwoven man-made fibrous layers of the precursor web are selected based on their dimensions, and hot processing tensile properties (viz., elongation-at-break). In general, the breaking draw ratio of the precursor web during hot processing should be less than about 4.0 and greater than about 1.4 evaluated while hot drawing at a strain rate greater than 2500%/min and temperature greater than the softening point but at least 10 degrees F less than the polymer melting temperature. This is an important indicator of precursor molecular orientation state for achieving sufficient stresses for CD thermoplastic fiber buckling and bending to cause reduction of the measures of pore size distribution of the web by the process of the present invention. The room temperature elongation (strain) at break should be between 2 and 40 percent, preferably between 5 and 20 percent, based on test method ASTM D 1117-77 using the Instron tensile testing machine. Note that the precursor webs disclosed in U.S. Pat. No. 4,048,364 are totally unsatisfactory for use in the present invention because such precursor webs are characterized as having at least 50%, preferably at least 70%, standardized elongation before break, preferable max processing draw ratio greater than 5. Webs made up of low modulus, low crystalline (less than 22%), exhibit too much elongation at low tension in the heating and drawing step to permit development of the necessary stresses. The webs useful in the process of U.S. Pat. No. 4,048,364 have far greater maximum draw ratio than 4 under the hot draw condition described above. It is estimated that these draw ratios are greater than 5.

Compressive stresses which buckle and bend CD thermoplastic fibers in the present invention are given by a sine function of the fiber tensile stress and the angles (see FIGS. 4 & 5) involved become smaller as MD processing draw ratio increases, so compressive forces diminish with draw ratio. In addition, the distribution of filament diameters in the above precursor web is an order of magnitude larger than those of the present invention and thus the bending rigidity of CD thermoplastic fibers is very much higher while compression stresses are relatively small during processing. Elastomeric polymer webs (e.g., elastomers having rubberlike properties of an elastomer or rubber; that is, having the ability to stretch at least twice their original length and retract at room temperature) cannot be used in the present invention.

The synthetic thermoplastic fibrous layers of the precursor nonwoven web may be made from many of the man-made thermoplastics capable of being melt blown, provided the polymer selected develops filaments of sufficiently high tensile processing modulus to permit the development of high lateral compression forces on the web. The thermoplastic resins useable in the production of nonwovens of man-made fibers include the nonelastomeric polyolefins such as polyethylene, polypropylene including high density polyethylene, ethylene copolymers EVA and EMA copolymers, nylon, polyamide, polyester, polystyrene, poly-4-methylpentene-1, polymethylmethacrylate, polytrifluorochlorethylene, polyurethane, polycarbonate, silicone, and polyphenylene sulfide.

The crystallinity of the thermoplastic fibers of the precursor web preferably should be sufficiently high to provide a room temperature breaking elongation of the precursor web of less than 40%. Meltblown webs useable in the present invention should break at a strain of less than 40 percent in accordance with ASTM test method D 5035-90. The crystallinity in the range of 30 to 70 percent is preferred. In general, the proper high modulus and state of molecular orientation of the precursor is best reflected by a maximum or breaking draw ratio of the web during post treating of less than about 4.0.

In the post-treatment process, the thickness of the precursor web should preferably be at least 2 mils and up to about 200 mils. The width of the web, of course, can vary within wide limits, with 5 to 150 inches being preferred. The average fiber diameter of the precursor meltblown fibrous layer of the web will preferably range from 0.5 to 8 microns, with 2 to 6 microns being preferred in order to provide the proper range of processing tensile stiffness for PP web. The porosity of the precursor web will normally be in the range of 50 to 95 percent. Calendered precursor webs approach 50%.

Other properties of the web, which while not critical, are important include a low occurrence of large shot or excessive ropiness.

Another important feature of the precursor web is that each of the layers of man-made fibers includes at least some fiber-to-fiber bonding which is typical in meltblown and spunbonded webs. The bonding can be achieved by inherent fiber-to-fiber fusion, or by point bonding, calendering, or by fiber entanglement. The properties of the selected polymer can be controlled to a degree by operation of the meltblowing or spunbonded process. Some of these control variables are disclosed under the experiments below.

Whereas the meltblown and spunbonded webs of thermoplastic man-made fibers of the prior art have required special and additional treatment following their formation in order to make these webs useful in disposable medical and sanitary products, the present inventors have found that through the combination of selected ones of these webs with selected cellulose-based layers of natural fibers in a bonded consolidated web, it is possible to produce a consolidated web which does not require that the man-made fibrous webs be specially treated independently, but rather these selected webs can be directly incorporated into the precursor web, hence into the consolidated web of the present invention. This capability provides the present invention with a substantial economic advantage.

As noted, a preferred precursor web in accordance with the present invention comprises an inner layer of cellulose-based natural fibers which is sandwiched between outer layers of man-made thermoplastic fibers. The precursor web, therefore, may comprise different combinations of layers. For example, in addition to the required layer of cellulose-based fibers, the precursor web may include a first layer of meltblown man-made fibers facing one surface of the cellulose fibers and a third layer comprising spunbonded man-made fibers facing the opposite surface of the cellulose fiber layer. In like manner, the first and third layers may both be either meltblown or spunbonded fibers. Still further, there may be provided multiple layers of cellulose fibers which may or may not be separated by additional inner layers of man-made fibers, either meltblown or spunbonded. In any event, the cellulose fibers are to be protected by outer layers of man-made fibers. It will be recognized that the addition of further layers to the precursor web increases the cost of the web and may detract from the hand and other desirable properties of the consolidated web.

Figure 10:
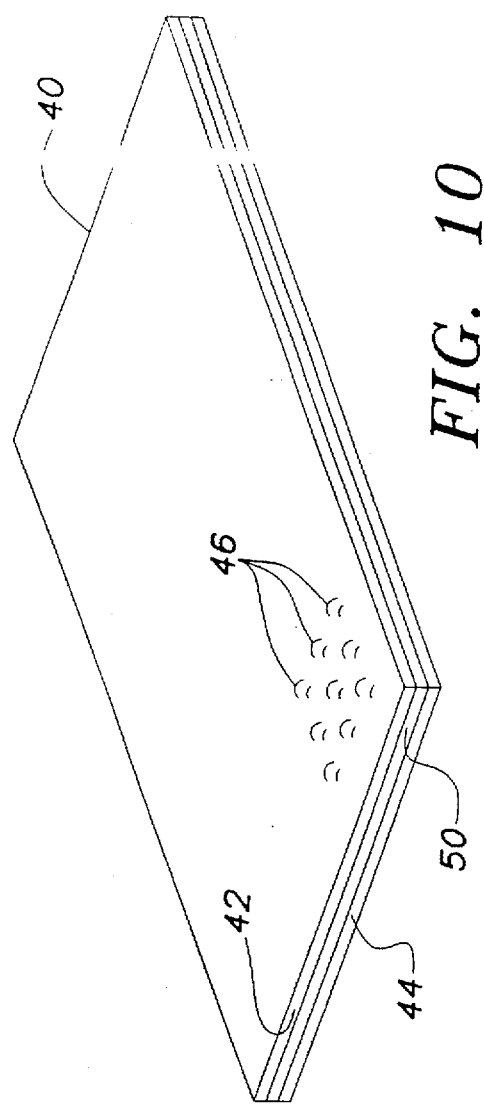
FIG. 10 is a schematic representation of one embodiment of a laminated precursor web which incorporates various of the features of the present invention.

In FIG. 10 there is depicted a web 40 which includes thermoplastic layers 42 and 44, plus a cellulose fiber layer 50 sandwiched therebetween. As depicted, these layers are binded one to the other by a pattern of diamond-shaped bonds 46 which are each of substantially the same size and spaced apart from each other.

Figure 11:
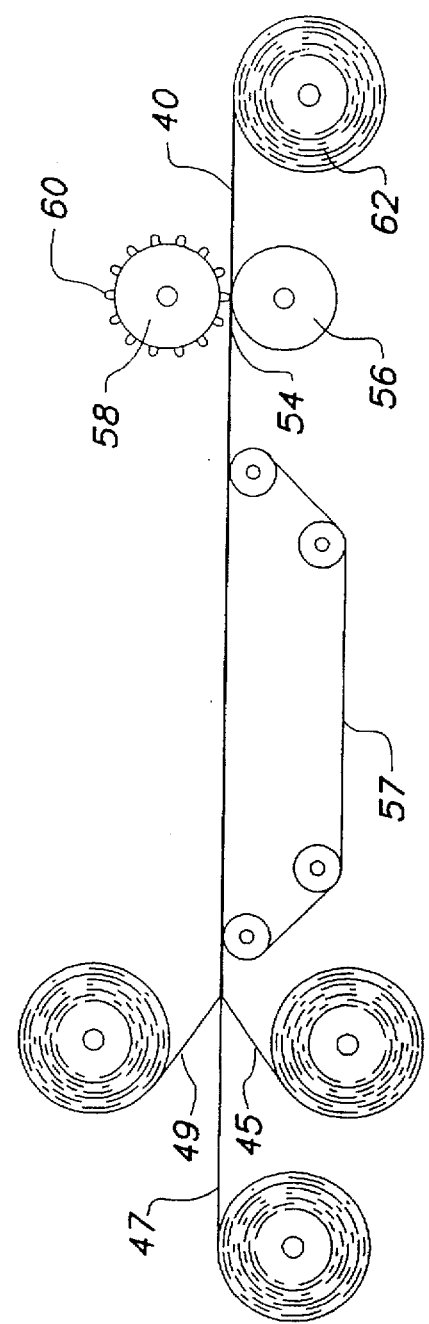
FIG. 11 is a schematic representation of a process for the formation of a laminated precursor web which incorporates various of the features of the present invention.

In FIG. 11, there is depicted schematically a process for overlaying previously formed layers 45, 47 and 49 into a web onto a forwardly moving conveyor 51 and thereafter bonding the layers into a coherent web 40 by passing the web through the nip 54 of a set of heated rolls 56 and 58. In this embodiment, the upper roll 58 is provided with a pattern of surface projections 60 which enhance the formation of the desired space apart bond areas 46. As depicted, the composite web 40 is collected in a roll 62 for storage and subsequent use. As desired, each of the webs 45 and 49 is formed from man-made fibers, e.g., by spunbonding, meltblowing or other process which provide a coherent self-sustaining web.

In FIG. 12, there is depicted schematically a process for the manufacture of a web of the present invention in which a first layer 70 of man-made thermoplastic fibers is formed employing a conventional meltblowing or spunbonding process 74 and thereafter deposited on a forwardly moving conveyor 72. A layer 78 of cellulose-based fibers produced either offline or inline as described in FIG. 13, is overlaid onto the first layer 70 that is disposed on the moving conveyor 72. A third layer 80 of thermoplastic man-made fibers is formed by a conventional meltblowing or spunbonding process 81 and overlaid onto the cellulose-based layer 78 to provide a three-layered web in which the cellulose-based fibrous layer 78 is disposed between outer layers 70 and 80 of man-made thermoplastic fibrous material. In the depicted process, these several overlaid layers are fed through the nip of a set of heated pressure rolls 84 and 86, one of which has a pattern of projections 88 on its outer surface, to thermally bond the several layers into a coherent web 89. The composite web may be collected in a roll 92 for further use. As discussed herein, one or both of the first and third layers, 70 and 80 may be formed by conventional meltblowing, spunbonding or like techniques, including thermal bonding of man-made staple fiber webs.

With reference to FIG. 13, there is depicted a further embodiment of a process for the manufacture of a web in accordance with the present invention. In the depicted process, a first web 94 of man-made fibers is formed as by means of an on-line conventional melt-blowing or spunbonding apparatus 96, fed past an idler roller 95, and deposited on the upper run of a first conveyor 97. As depicted, the process further includes an in-line carding section 98 in which a bale 99 of cellulose-based fibrous material is introduced to an in-line carding unit 100 from which a carded web 101 is fed directly from the carding unit onto a second conveyor 102. From the conveyor 102, the cellulosic web is fed forwardly onto the top of the web 94 on the conveyor 97. Further, a third web 104 of man-made fibers is formed as by means of a further in-line conventional meltblowing or spunbonding apparatus 105 and fed past an idler roller 106, and overlaid upon the top surface of the cellulosic web 101 wherein the cellulosic layer 101 becomes sandwiched between the webs 94 and 104 of man-made fibers. These layers of webs are fed forwardly through the nip 107 of a set of heated rolls 108 and 109, the upper one 108 of which is provided with projections 111 on its outer cylindrical surface for effecting spaced-apart thermal bonds between at least the top web 104 and the cellulosic web 101 to form the layers into a composite web. The bonded composite 113 is collected in a roll 115 for subsequent storage and use. Optionally, a layer of man-made staple fibers may be formed into a web 117 as by means of a conventional air laying web former 119 and interposed into the composite 113 between the cellulosic web 101 and one or both of the man-made fiber webs 94 and 104.

Samples of precursor webs employing features of the present invention were manufactured employing the process depicted schematically in FIG. 11. In the preparation of the present samples, the cellulose-based fibers 47 were fed to an opener-mixer where the fibers from a bale were opened and uniformly mixed. The fibers from the opener mixer were fed through a card wherein the fibers were carded to develop a web which was doffed directly from the card, without being wound up, and fed onto a layer of thermoplastic man-made fibers 45 carried on a conveyor 51. The card employed in the manufacture of the present samples had a randomizing unit attached to its exit end so that the fibers were randomly oriented in the web with little or no preferred orientation in the machine direction. Thereafter, a third layer 49, comprising thermoplastic man-made fibers, was overlaid on top of the cellulose fiber layer so that the cellulose fiber layer was sandwiched between the two outer layers of thermoplastic man-made fibers. This laminate was then fed through the nip 54 between a set of heated rolls 56 and 58, one of which was of a smooth surface 56 and other 58 of which was provided with a pattern of spaced projections 60, each of which was of a diamond-shaped cross section. Tables I and II provide further details regarding the operational parameters employed in the preparation of these samples and the composition of the various samples.

TABLE I

Parameters and Their Levels

| Parameter | No. of Levels | Values |
|---|---|---|
| Melt Blown Fabric | | |
| 1. Resin | 2 | Himont Valtec 442, Exxon PD 3495G |
| 2. Fabric Weight | 2 | 0.7 oz/yd², 0.5 oz/yd² |
| Staple Fiber Web | | |
| 1. Weight | 1 | 1.0 oz/yd² |
| 2. Constituent Fibers | 2 | Cotton (C), Polypropylene (PP) |
| 3. Fiber Denier | | |
| Cotton Denier | 1 | 1.75 (Veratec 'Easy Street') |
| PP Denier | 2 | 2.2 (Hercules T-185) |
| | | 3.0 (BASF bico 'Merge 1080') |
| 4. Fiber Length | | |
| Cotton Length | 1 | 1.0 inch |
| PP Length | 1 | 1.5 inch |
| Thermal Bonding Process | | |
| 1. Pattern of engraved roll | 1 | Diamond |
| 2. Area percent of raised pattern | 1 | 16.6%* |
| 3. Nip Pressure | 1 | 250 PLI (pounds/linear inch) |
| 4. Temperature: | | |
| Top Roll | 4 | 128° C., 133° C., 134° C., 135° C. |
| Bottom Roll | 4 | 127° C., 129° C., 131° C., 132° C. |
| 5. Surface Speed of Calender Rolls | 1 | 29 ft/min |

*Bonding area of Kusters Calender used to make samples in Table II

The precursor web samples produced as listed in Tables I and II were tested for various properties as indicated below:

Barrier

Barrier refers to the ability of a fabric to resist strike-through of fluid and microorganisms. Barrier properties protect the operating room staff and the patient from infection.

| Test | Test Procedure Used |
|---|---|
| Hydrostatic Pressure | AATCC Test Method 127-1985 |
| Oil Repellency Rating | AATCC Test Method 118-1983 |
| Water Impact Penetration | AATCC Test Method 42-1985 |
| Water Spray Rating | AATCC Test Method 22-1985 |

Strength

Medical nonwovens also need to be strong enough to prevent tearing and puncturing all the way from manufacturing steps through use of the finished product.

| Test | Test Procedure |
|---|---|
| Breaking Load | IST[1] 110.0–70 (82) |
| Elmendorf Tear Strength | IST 100.0–70 (R82) |
| Mullen Bursting Strength | IST 30.0–70 (R82) |
| Tensile Elongation | IST 110.0–70 (82) |

[1]INDA (Association of the Nonwovens Fabrics Industry) Standard Test.

Drapability and Comfort

Drapability of a nonwoven fabric refers to its ability to conform to the shape of the object it is covering. The objects include patients, operating room tables and equipment.

Comfort relates to breathability, selection of materials and product design.

| Test | Test Procedure |
|---|---|
| Frazier Air Permeability | IST 70.1–70 (R82) |
| Cantilever Bending Length | ASTM D 1388-64 |

The results of these tests are given in Tables III.

TABLE II

PROCESSING CONDITIONS OF MELT BLOWN/COTTON/MELT BLOWN LAMINATE[1] SAMPLES

| Sample No. | Weight of Layers[2] (oz/yd²) Top/Mid/Bottom | Composition of Layers Top | Composition of Layers Middle | Composition of Layers Bottom | Bonding Roll Temperature (°C.) Top | Bonding Roll Temperature (°C.) Bottom | Composition of Composite Web Cotton (%) | Composition of Composite Web PP (%) |
|---|---|---|---|---|---|---|---|---|
| 1 | 0.7/1.0/0.7 | UT-1-24[3] | 100% Cotton | UT-1-24 | 128 | 129 | 41.8 | 58.2 |
| 2 | 0.7/1.0/0.7 | UT-1-24 | 100% Cotton | UT-1-24 | 134 | 129 | 41.8 | 58.2 |
| 3 | 0.7/1.0/0.5 | UT-1-24 | 100% Cotton | UT-1-17[4] | 134 | 129 | 45.4 | 54.6 |
| 4 | 0.7/1.0/0.7 | UT-1-24 | 100% PP[5] | UT-1-24 | 135 | 132 | 0 | 100 |
| 5 | 0.7/1.0/0.5 | UT-1-24 | 100% PP[5] | UT-1-17 | 135 | 132 | 0 | 100 |
| 6 | 0.7/1.0/0.5 | UT-1-24 | 100% BF PP[6] | UT-1-17 | 135 | 132 | 0 | 100 |
| 7 | 0.7/1.0/07 | UT-1-24 | 100% BF PP[6] | UT-1-24 | 135 | 132 | 0 | 100 |

[1]40-inch web produced.
[2]Outer layers consisted of different weights of meltblown (MB) Polypropylene (PP) and middle layer consisted of staple fiber.
[3]Himont Resin MB Polypropylene (0.7 oz/yd²).
[4]Himont Resin MB Polypropylene (0.5 oz/yd²).
[5]Hercules Grade T-185 Polypropylene.
[6]BASF bicomponent fiber.

TABLE III

TEST RESULTS OF UNFINISHED LAMINATE FABRICS

| Sample No. | Bending Length (cms) MD | CD | Bursting Strength (psi) | (kPa) | Tear Strength (gms) MD | CD | Air Permeability cu.ft/ min/ ft² | cu.m/ sec/ m² | Breaking Strength (kg/cm) MD | CD | Elongation (%) MD | CD | Hydrostatic Pressure (cm) | Water Spray Rating | Water Impact Penetration (gm) | Oil Repellency Rating |
|---|---|---|---|---|---|---|---|---|---|---|---|---|---|---|---|---|
| 1  | 7.22 | 5.63 | 11   | 75.79  | 98   | 174  | 32.00 | 0.16  | 0.83 | 0.54 | 14   | 21.2 | 34 | 90 | 0.43 | 0 |
| 2  | 7.91 | 5.97 | 9.4  | 64.77  | 84   | 126  | 30.51 | 0.16  | 0.90 | 0.49 | 11.6 | 20   | 32 | 80 | 0.37 | 0 |
| 3  | 7.02 | 5.27 | 7.7  | 53.05  | 68   | 114  | 32.84 | 0.17  | 0.80 | 0.43 | 10.4 | 22.8 | 24 | 70 | 0.9  | 0 |
| 4  | 7.4  | 5.14 | 19.1 | 131.60 | 158  | 694  | 30.90 | 0.16  | 0.97 | 0.50 | 20   | 24.8 | 39 | 70 | 0.83 | 0 |
| 5  | 6.98 | 5.20 | 17.3 | 119.20 | 126  | 488  | 36.70 | 0.19  | 0.88 | 0.40 | 22.4 | 21.6 | 57 | 80 | 4.33 | 0 |
| 6  | 7.37 | 5.14 | 19.4 | 133.67 | 166  | 248  | 36.42 | 0.19  | 1.46 | 0.45 | 24.8 | 24.4 | 42 | 80 | 1.73 | 0 |
| 7  | 7.53 | 5.49 | 19.1 | 13.60  | 112  | 292  | 30.17 | 0.15  | 1.39 | 0.43 | 26   | 24   | 48 | 70 | 0.33 | 0 |
| 8  | 3.68 | 4.04 | 39.5 | 272.16 | 853  | 1209 | 26.37 | 0.132 | 1.42 | 1.59 | 35.6 | 34.4 | 50 | 90 | 0    | 0 |
| 9  | 3.93 | 2.70 | 39.3 | 270.78 | 613  | 660  | 16.77 | 0.083 | 1.49 | 1.35 | 22   | 28.4 | 62 | 70 | 0    | 8.0 |
| 10 | 4.62 | 4.88 | 40.3 | 277.67 | 1179 | 1755 | 13.66 | 0.068 | 1.32 | 1.66 | 31.2 | 35.2 | 77 | 90 | 0    | 0 |
| 11 | 3.90 | 2.94 | 42.5 | 292.83 | 641  | 746  | 11.9  | 0.059 | 1.59 | 1.33 | 24.8 | 27.6 | 58 | 70 | 0    | 7.5 |

Note:
Sample No. 8 = 1.8 oz/sq. yd unfinished SMS (Spunbonded/melt blown/spunbonded) fabric.
Sample No. 9 = 1.8 oz/sq. yd finished SMS fabric.
Sample No. 10 = 2.3 oz/sq. yd unfinished SMS fabric.
Sample No. 11 = 2.3 oz/sq. yd finished SMS fabric.

As indicated above, the primary purpose of the process of the present invention is to consolidate the precursor web in the cross direction to reduce the average pore size and the pore size distribution in the web and to impart to the web enhanced breathability, strength, hand, drape, absorbent capacity and barrier properties. Consolidation of the web in the cross-direction is to be distinguished from consolidation resulting from calendering since consolidation to reduce thickness as in calendering flattens the fibers and closes flow channels, thus decreasing the permeability of the web to a greater extent compared to web draw consolidation.

Figure 4:
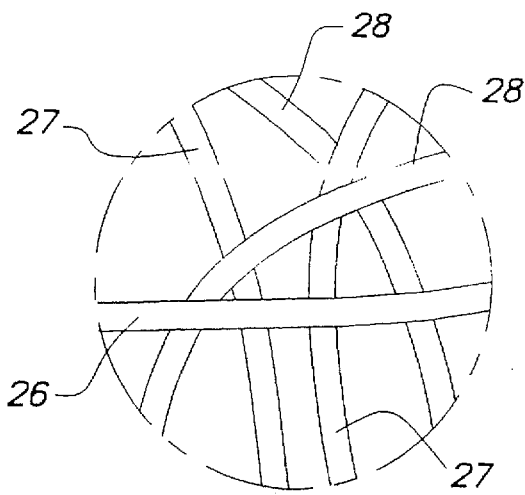
FIG. 4 is an enlarged plan view of a tiny planar segment of a meltblown web illustrating the random nature of a layer of man-made fibers of a precursor web useable in the present invention.

The random nature of low stretch meltblown webs with the attendant thermal bonding and/or filament entanglement enable the development of MD stresses to reorient fibers and create sufficient compressive stresses to laterally consolidate or squeeze them together thus reducing the size of voids there between during uniaxial drawing. This results in narrowing of the web width without disrupting the planar integrity of the web and produces a product of unique properties. During the post-drawing process, the modulus that is in effect while the filament segments are being drawn depends on processing time-temperature effects. Maximum consolidation in the CD is achieved at a trial and error modulus at which the compressive stresses overcome to the largest extent the critical buckling stresses for the population of CD segments in the web. This is illustrated in the post-drawing process preferably carried out at a temperature where the polymer is in the rubbery state. This is best illustrated with reference to FIGS. 4, 5 and 6 which depict, respectively, the random disposition of nonwoven fiber, an idealized representation of unconsolidated nonwoven fibers, and an idealized representation of consolidated nonwoven fibers. The random disposition of the filaments forming a thin planar layer of the meltblown web is represented in FIG. 4 wherein longitudinal fibers 26 extend generally in the MD, transverse fibers 27 extended in the CD, and intermediate segments of fibers 28 extend at an angle with respect to the MD and CD.

Figure 5:
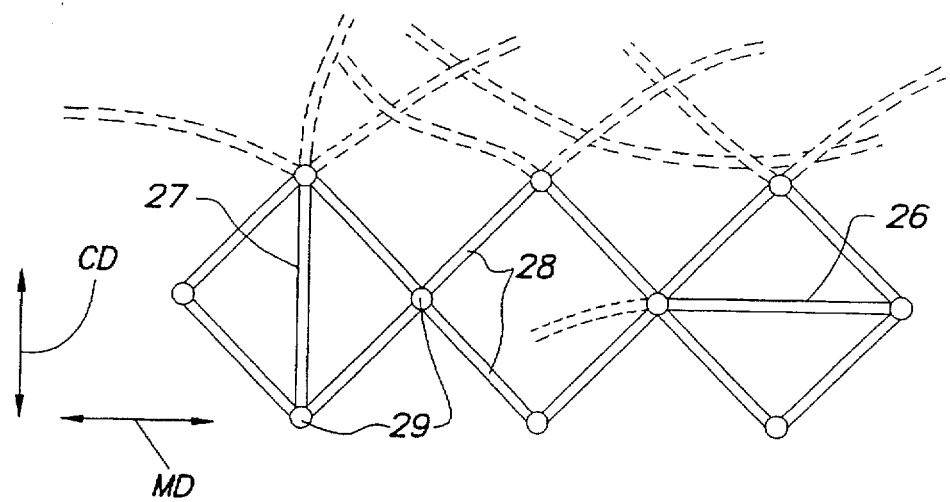
FIG. 5 is an idealized plan view representation of the fibers of a layer of man-made fibers of a precursor web facilitating the analysis of the mechanisms involved in the present invention.

For purposes of analysis, this planar disposition may be represented by representative cells illustrated in FIG. 5. In the idealized representation or model in FIG. 5, the fibers 26, 27, and 28 are shown interconnected or bonded as a loose network at junctions 29 of the fibers. Again, it is to be emphasized that the bonds are fuse bonded during the meltblown process, or by fiber entanglement, or by thermal point calendering techniques. When the web structure shown in FIG. 5 is subjected to tension in the MD, the intermediate fibers 28 are easily aligned in the MD thus reducing pore dimensions whereas the CD fibers 27 tend to resist compression of the cell in which it is associated and may buckle and bend as illustrated in FIG. 6. The result is that the lateral consolidation of the precursor web in accordance with the present invention leaves pore space throughout the web layer which depends on the extent to which CD fibers are buckled. Fiber having a high slenderness ratio of length by diameter buckle easier. Ideally, the compressive force on element 27 in FIG. 6 is 2Tsin(theta) where T is the tensile force in elements 28 and $\Theta$ is the angle between element 28 and the MD. Without the bonding at junctions 29, the webs would easily rupture without generating lateral (CD) compression. Although actual webs do not include only the idealized structure as depicted in FIGS. 5 and 6, there is sufficient bonding and stresses developed in the select precursor web to provide the reduced porosity following the thermal drawing process as in FIG. 2 and 3. Note that the buckled CD fibers 27 act as spacers limiting the residual porosity and pore dimensions developed by the resultant compression forces due to the MD tensile drawing force. To supplement the compression of large diameter fibers and shot, external mechanical means can be incorporated to further compress the hot drawn web near 17c in order to augment the CD fiber bending and buckling beyond that obtained by hot drawing alone. One such apparatus embodiment is illustrated in FIG. 3 described above in which the mostly drawn web is subjected to transverse compression forces because the web is tracking the converging surface of the torus.

The post-drawn web withdrawn from the oven and preferably heat set exhibits several surprising and highly useful properties: (1) the pore space and all measures of pore size distribution have been reduced, (2) the web exhibits remarkable elasticity in the CD, and (3) the web exhibits enhanced strength, wicking, absorbent capacity, breathability and barrier properties. These properties will be discussed in detail later.

The post-drawing process conditions and precursor properties for achieving the web with the improved properties described above are as follows:

| | BROAD RANGE | PREFERRED RANGE | BEST MODE |
|---|---|---|---|
| Draw ratio, V2/V1 | 1.05–3.00 | 1.10–2.00 | 1.2–1.80 |
| Temperature, °F. (PP) | 165–425 | 250–350 | 275–300 |
| V1, Feed Speed, F/M | 10–400 | 25–200 | 35–60 |
| MAX pore size, μM | 5–250 | 10–150 | 20–50 |
| Crystallinity, % | 30–95 | 30–80 | 35–60 |
| Thickness, mils | 2–200 | 2–100 | 6–20 |
| Avg. Fiber Dia. μM | 0.5–50 | 0.5–8 | 1.7–6 |
| Strain rate, per min | 10–500 | 20–200 | 30–60 |
| Hot processing breaking draw ratio, V2/V1 | 1.3–4 | 1.7–3.5 | 2–3 |
| Reduction in pore size (MAX, MFP, and range), % | 20–85 | 25–75 | 35–70 |
| Elastic recovery from 50% strain, % | 50–99 | 70–99 | 80–95 |
| Liquid absorption aspect ratio | 1.2–6 | 1.76–5 | 2–4 |

It should be observed that the geometric minimum MD strain for complete lateral consolidation of an idealized web in FIG. 5 is 42 percent or DR=1.42. However, in the most preferred embodiment the invention contemplates draw ratios in excess of about 1.42 since higher draw ratios will enhance the reduction in porosity, which is limited by the spacer effects of partially buckled CD fibers.

Through the selection of the resin and meltblowing operating conditions, precursor webs having the necessary properties may be obtained based upon the above description.

Although the man-made fibrous layers of the precursor webs made up of any of the thermoplastic polymers used in meltblowing (provided they possess the necessary properties) may be used, the following polypropylene meltblown layer of the precursor web has produced excellent results in experiments carried out at the University of Tennessee.

| PP Grade (Exxon Grade) | PD-3495 G |
|---|---|
| MFR | 800 |
| Thickness | 13 mil |
| Width | 14 inches |
| Basis Weight | 1.5 oz/yd$^2$ |
| Porosity | 87% |
| Crystallinity | 50% |
| Web elongation at break | 10% |

As illustrated in FIG. 2, the precursor web 17 in a generally flat disposition is processed according to the present invention by passing the flat web 17 in an oven 23 at a temperature between the softening and melting temperature of the polymer (e.g., for PP, about 310 degrees F.). The line speed and draw ratio are selected to impart the desired lateral consolidation of the web expressed as a ratio of the web 17a width entering the oven to web 17c width exiting the oven (a/c in FIG. 2). The a/c values should be from 1.3 to 4, preferably from 1.5 to 3, and most preferably 2 to 2.5. Web thickness entering the oven may range from 2 mils to 100 mils and those exiting may range from between 2 and 150 mils, indicating that the thickness may under certain conditions increase. Draw ratios of 1.05 to 3.00, preferably from 1.10 to 2.00, and most preferably 1.2 to 1.8 may be used to achieve satisfactory consolidation. Line speeds (V2) can range from 10 to 400 fpm. As mentioned above, webs capable of hot processing breaking draw ratios greater than about 4 are unsuitable.

It is preferred that the consolidated and annealed web leaving the oven be cooled, either by ambient temperature or supplemental air to impart a set to the fibers in the deformed condition. The consolidated heat set web can be rolled up for later conversion to end use products.

The web consolidation restructures the thermoplastic fibers of the web by aligning more of the fibers in the MD. The fiber bonding transforms tensile stress into CD consolidation in the manner described above, thereby reducing all of the web's measures of pore size distribution. These measures of pore size distribution of the web are the maximum pore size (MAX), the mean flow pore size (MFP), and the minimum pore size (MIN) as measured by a Coulter Porometer.

Definitions

In order to better understand the terms used herein, particularly in the Experiments described below, the following definitions consistent with the accepted technical definitions in the industry, are submitted.

Web Pore Space (porosity)—the ratio of the volume of air or void contained within the boundary of a material to the total volume expressed as a percentage. Packing density equals 1 minus porosity.

Coulter Porometer—a semiautomated instrument using a liquid displacement technique to measure the pore size measures and distributions of a sample according to ASTM F 316-86

Web Pore Size Distribution—the distribution of pore sizes between the maximum and the minimum pore size as determined by ASTM F 316-86 on the Coulter II Porometer. (The maximum pore size [or bubble point] measure is distinguished in that it strongly relates to permeability, pressure drop, and filtration efficiency performance properties for the entire family of meltblown webs we studied.)

ASTM 316-86 Measures of Pore Size Distribution— MAX is the standardized measure of the diameter of the largest pore channels in the distribution of pore sizes supporting flow through the web. MFP is the measure of the median (or mean) pore channel diameter for the pores supporting the total flow. MIN is the minimum pore size measured for the web.

Polymer Crystallinity—the relative fraction of highly ordered molecular structure regions compared to the poorly ordered amorphous regions. Crystallinity is determined by X-ray or DSC analysis.

Polymer Birefringence—is a property which is usually observed in optical microscopes when a material is anisotropic, that is when its refractive index is directional. Fibers having molecular chains of higher axial directionality have higher birefringence and relatively low tensile elongation at break.

Softening Temperature—is a thermal property of a polymer characterized by a temperature at which the material becomes sticky, viscous, or elastic (soft) prior to melting and looses its room temperature modulus (and can undergo plastic elongation) leading to maximum molecular orientation and breakage.

Average Fiber Diameter—a measure of the mean fiber diameter of the fibers in the web obtained from individual measures of the fibers diameters in focus on a scanning electron micrograph of the subject fibrous web—about 100 fibers are measured. Finer fibers generally arise from greater draw-down in meltblowing and have higher birefringence.

Web Elongation at Break—for a crystalline polymer is strain rate and temperature dependent. The elongation at break primarily measures the extent of a plastic deformation process beginning at the initial state and terminating at the final well ordered state of molecular orientation (MO) of the polymer. Precursor webs having fibers of high crystallinity and order have low elongation to break (from R. J. Samuels, Structured Polymer Properties, John Wiley & Sons, 1973). For the meltblown webs, evaluating the precursor MO state by breaking elongation is best accomplished at high temperatures instead of at standardized ASTM D 5035-90 room temperature test because of the wide range in fiber diameters, MO state and bonding in meltblown webs. The meltblown precursor webs were characterized by the magnitude of the breaking draw ratio attained while hot drawing at a strain rate at least 25 min-1 (or 2500%/min) and temperature at least 10 F. below the melting temperature of the precursor thermoplastic polymer (Hot breaking draw ratio).

Web Tensile Modulus—is the measure of the force required to produce a small extension (or compression). A highly inextensible material will usually have a large modulus.

Web Elasticity—that property of a body by virtue of which it tends to recover its original size and shape after deformation. Elastic recovery from elongation is given by (stretched length—recovered length)/(stretched length—original length). The recovery from an initial elongation is stated, such as, a 47% recovery from a 100% CD strain.

The process conditions to produce a desired meltblown sample for evaluation were controlled as follows:

(a) the level of hot-drawability, as related to birefringence and tensile modulus during processing is a function of fiber-diameter and was controlled by varying the primary air levels in the line from 70 to 95%, (b) the level of bonding in the web was controlled by adjusting the air to polymer ratio, the die to collector distance, the air temperature, the melt temperature and collector vacuum. Tenacity and the elongation-at-break was used to qualify the bonding strength for the samples.

The slenderness ratio of fiber segments subjected to compression as well as the magnitude the bending forces developed by drawing are ultimately related to the above.

The post-drawing on the precursor web was done in experimental apparatus similar to that illustrated in FIG. 2 and 3. The rollers were provided with speed controls.

The polymer used in all of the tests was polypropylene (PP). The PP precursor web samples used in the tests are described in Table IV.

TABLE IV

| Sample | % Air | Packing Density | Ave. Fiber Diam. μm | Break Elong. | Pore Sz. Measure, μm Max | MFP | Min | Break D.R. |
|---|---|---|---|---|---|---|---|---|
| A | 90 | 0.095 | 3.2 | 7.4 | 19.3 | 15.4 | 11.1 | 2.2 |
| B | 90 | 0.110 | 3.9 | 6.3 | 17.9 | 14.3 | 10.5 | 2.5 |
| C | 85 | 0.085 | 4.0 | 17.4 | 28.3 | 16.6 | 10.7 | 2.5 |
| D | 80 | 0.129 | 5.5 | 6.6 | 38.8 | 20.1 | 13.8 | 3.0 |
| E | 70 | 0.145 | 8.5 | 3.0 | 20.8 | 14.4 | 10.9 | 3.5 |
| F | 70 | 0.163 | 9.9 | 4.1 | 40.5 | 24.2 | 16.5 | 3.7 |
| G | 70 | 0.172 | 8.8 | 5.7 | 33.0 | 20.6 | 13.7 | 3.8 |
| H | 60 | 0.168 | 18.5 | 2.7 | 117.0 | 68.0 | 25.0 | 6.0 |

Web Measurements

Fiber diameters were measured by SEM photographs of the specimens.

Maximum, mean flow pore size, minimum, and pore size distribution spread in terms of the maximum and minimum, was based on a Coulter Porometer according to ASTM F 316-86.

Pore Space

Measurements were based on weights of dry specimens and the weight of the specimen wetted out with a liquid of known density. Planar densification is evidenced by the increase in packing density (PD) measure of the web given by the ratio of dry web weight to the weight of the void-free web. Porosity of the web or pore space is given by one minus the packing density.

Figure 9:
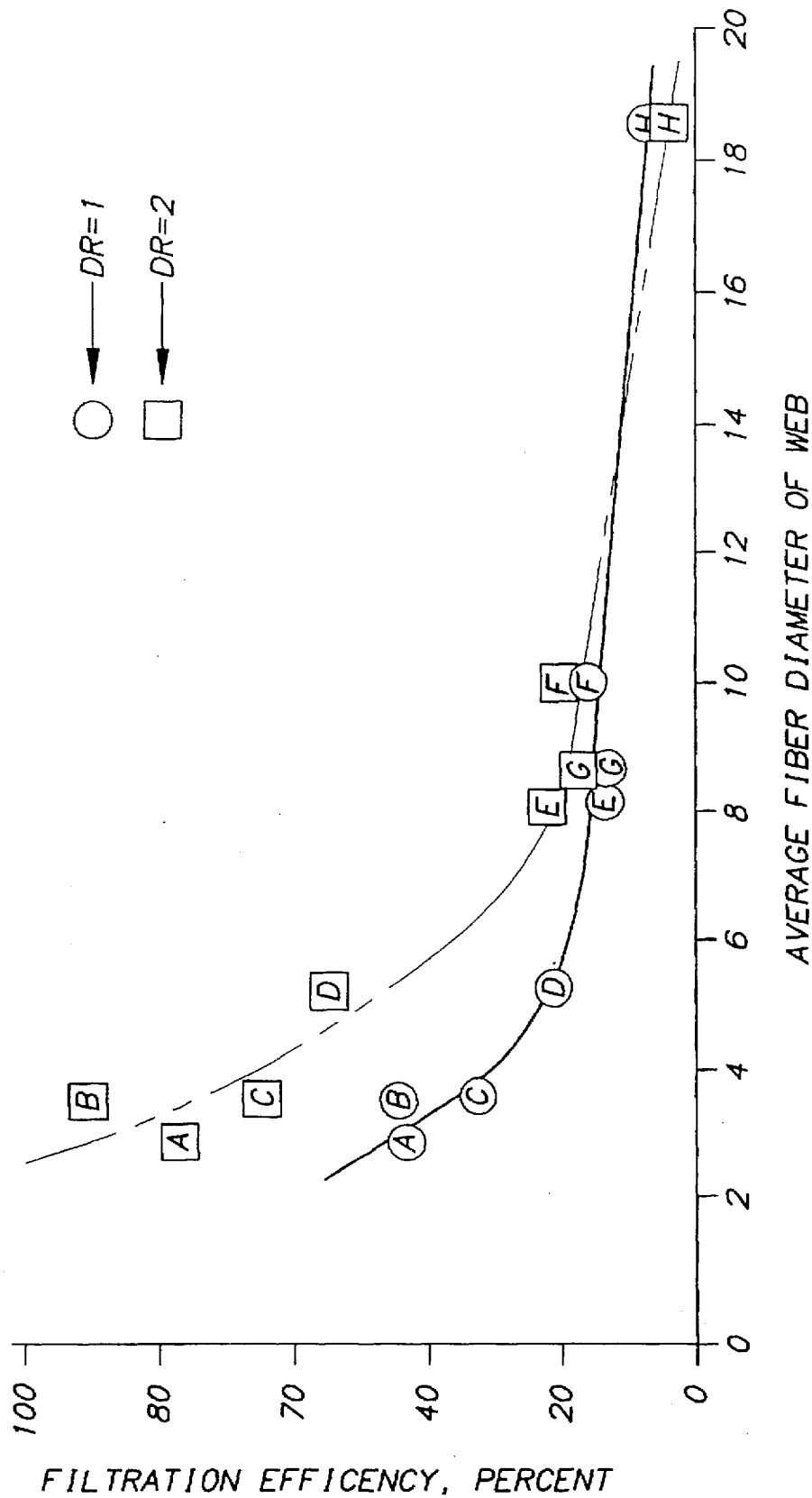
FIG. 9 is a plot illustrating that precursor meltblown webs (circles) having fiber diameter greater than about eight microns show negligible improvement in particle filtration efficiency after post drawing (squares).

The tests for measuring elasticity of the consolidated web were as follows: Measured the percentage to which specimen recovered its original (CD) length immediately following a given % (CD) elongation, for example, sample A recovered 92% of its original length following a 100% CD elongation. Another test on the consolidated webs included directional absorption of liquids. Surfactants for improving the water wettability of the fibers were applied to PP webs prior to aqueous absorption tests. The surfactants were nonionic and other types such as nonionic polyoxyethylenated tert-octylphenol, anionic ammonium lauryl sulfate, and cationic sulfobetaines. Directional absorption was characterized by the aspects ratio of the absorption pattern produced when a milliliter of liquid was applied to a point on the specimen supported on a horizontal surface. For a variety of meltblown and spunbonded specimens, absorption aspect ratios ranged from 1.7 to about 5. The test results carried out on the webs consolidated at a DR of 2 are presented in Table V. The filtration efficiency values for meltblown webs variously consolidated at draw ratios of 1.0 (undrawn precursor web), and 2 (precursor drawn 100%) are plotted in FIG. 9.

TABLE V

| | | Properties of DR = 2.0, of precursor web | | | | |
|---|---|---|---|---|---|---|
| | Oven Temp. | Elastic recovery from strain of | | Packing Density | Pore Size Measures, μm | | |
| Sample | °C. | 50% | 100% | | Max. | MFP | Min. |
| A | 150 | 95 | 92 | 214 | 50 | 46 | 42 |
| B | 155 | 93 | Break | 250 | 44 | 39 | 39 |
| C | 150 | 95 | 90 | 302 | 49 | 60 | 65 |
| D | 150 | 95 | 90 | 163 | 38 | 48 | 51 |
| E | 150 | 87 | Break | 124 | 155 | 124 | 118 |
| F | 150 | Break | Break | 101 | 73 | 76 | 78 |
| G | 150 | 85 | Break | 95 | 113 | 103 | 108 |
| H | 150 | Break | Break | 99 | 128 | 115 | — |

The Table V data and properties of webs consolidated at DR=2 reveal that the pore sizes of sample A through D were reduced by 38 to 65% and the packing density for the same samples were increased from 163 to 302%.

The maximum hot draw ratio is the magnitude of the breaking draw ratio during hot processing and solely defines the molecular orientation present in the filaments of the precursor melt blown webs. Webs of PP having a maximum DR greater than about 3.5 are not consolidated according to the present invention. Compare pore measures in Table IV and the changes produced at a DR of 2.0 in Table V. The data on FIG. 9 indicates that filtration efficiencies improve significantly for fiber diameters less than 8 microns, particularly less than 6 microns, the preferred and most preferred fiber sizes. Note that these small fiber sizes further distinguish over U.S. Pat. No. 4,048,364.

ALTERNATIVE EMBODIMENTS
Spunbond Webs

As indicated above, the principles embodied in the present invention have application with nonwoven webs of manmade fibers other than meltblown webs. For example, for spunbond webs which are characterized as having an average filament diameters of 7 to 50 microns and elongation to break less than about 200% according to ASTM Test D 5035-90. The spunbond webs are prepared by melt spinning a multiplicity of filaments molecularly oriented by plastic deformation draw-down and depositing the same on a moving collector to form a random collection of uniform filaments arranged similar to that depicted in FIG. 4. The deposited filaments are then bonded by mechanical entangling, needling, hot calendering or otherwise thermal bonding at a plurality of points to impart integrity and strength to the spunbond material. It should be noted that bonding such as thermal or mechanical bonding is normally necessary since the filaments are not typically fused or sufficiently entangled upon being laid or deposited on the collector. For spunbonded precursors, the bonding must be strong (such as high temperature point bonding) in order to locally elongate, buckle, and bend the filament segments without spoiling the web integrity (see FIG. 5 and 6) because the drawn filaments have relatively high tenacity and modulus. In point bonding, the bond points and bonding pattern generally are as follows: The area of heated bonding points are 5 to 25% of the roll area and the shape of the raised points can be diamond shaped or a number of other shapes and point distributions.

The consolidation of the spunbond (SB) web in accordance with the present invention occurs as follows: Hot drawing the SB web creates reduction in the measures of pore size and creates CD elasticity because the tensile forces generate sufficient compressive forces to plastically buckle and bend CD segments of the filaments for inventive reduction of pore measures. The elasticity in the CD direction is a result of elastic recovery from bending of the well bonded network of strong filaments arranged similar to that idealized in FIG. 6.

An example of the spunbond process was as follows: Spunbonded web was 1 meter wide, 1 oz/sq. yd. produced from 35 MFR PP on a Reicofil machine bonded between 90° and 140° C. at the University of Tennessee. Oven temperature 315° F., draw ratio 1.20 output velocity (V2) 50 FPM.

Electrostatic Charged Webs

Another variation contemplated by the present invention is to apply an electrostatic charge to the consolidated web to improve its filtration performance. The charging in the production of electrets can be applied by a variety of techniques described in the patent literature. See for example U.S. Pat. No. 4,592,815, the disclosure of which is incorporated herein by reference. It is anticipated that the higher packing density of fiber in the hot consolidated webs results in an unusually high effectiveness of electron and ion implantation in the web. As an example of the effect of charging consolidated samples on web Filtration Efficiency (FE), a 1.0 oz/sq.yd. precursor meltblown sample had an FE of 30%, the FE after only consolidating this web at a DR of 1.5 was 79%, and finally the FE after charging this consolidated web was 99.8%.

Several 40-inch wide meltblown polypropylene (PP) precursor webs were prepared at weights of 0.25, 0.50 and 0.75 oz/sq yd at the Accurate Products Company of Hillside, N.J., and 0.6 oz/sq yd spunbonded PP web was produced at the University of Tennessee, Knoxville, Tenn. Ten cotton-based nonwoven fabrics were produced at the John D. Hollingsworth Company, Greenville, S.C. at a width of 40 inches (trimmed to a width of 36 inches). A Hollingsworth 40-inch card with flat tops and with a Web Master Take-Off was utilized to produce a cotton (Veratec Easy Street scoured and bleached cotton) core web with a weight of 1.0 oz/sq yd. Cotton core webs of 1.5, 2.0 and 3.0 oz/sq yd were produced by employing a 2.5 meter Hollingsworth Master Card to feed the random carded cotton webs into a Hergeth Model 0.430 Crosslapper. These webs were lightly needled (125 punches/sq inch using one board) with a Dilo Model ODR needle loom using a Foster needle (15×18×3 style). The webs where transported to the 40 inch carding and thermal bonding line and a MB (or SB as the case called for) web was mounted at the rear of the conveyor system for the carded webs. The specified weight of cotton core web was unwound onto the MB (or SB) web travelling on the conveyor running under the card. As noted above, the 1.0 oz/sq yd webs were carded on that card utilizing the Web Master Take-Off. The top MB (or SB) web was unwound onto the carded cotton web and then the tri-laminate was conveyed at a 45 degree angle to the nip of a Kusters 2-Roll 1.5 meter thermal calender with the top heated steel roll having a raised diamond pattern resulting in 16.6% bonded area. The bottom heated roll had a smooth steel surface.

Table VI provides an identification of the tri-laminates, particularly their composition. Table VII provides a comparison of several of the properties of the tri-laminates before consolidation and the values of these same properties after consolidation in the manner described hereinbefore. Table VIII presents the results of absorbent capacity and retention capacity of the tri-laminates before and after consolidation. Table IX presents the results of testing of the consolidated tri-laminates for elastic recovery, breaking strength and elongation.

TABLE VI

TRI-LAMINATE SAMPLE IDENTIFICATION

| Sample No. | Sample Description | Weight of Layers (oz/yd$^2$) Top/Middle/Bottom | Total Weight g/m$^2$ |
|---|---|---|---|
| | MCM LAMINATES | | |
| 1C | MCM-42-2.4[1] | 0.7/1.0/0.7 | 2.4 |
| 6C | MCM-67-4.5 | 0.75/3.0/0.75 | 4.5 |
| 7C | MCM-73-2.75 | 0.25/2.0/0.5 | 2.75 |
| | SCM LAMINATES | | |
| 9C | SCM-60-3.35[2] | 0.60/2.0/0.75 | 3.35 |
| 10C | SCM-69-4.35 | 0.60/3.0/0.75 | 4.35 |
| | SCS LAMINATE | | |
| 11C | SCS-45-2.2[3] REPELLENT FINISHED LAMINATES | 0.60/1.0/0.60 | 2.2 |
| 1C-R[4] | MCM-40-2.5 | 0.75/1.0/0.75 | 2.5 |
| 10C-R | SCM-69-4.35 | 0.60/3.0/0.75 | 4.35 |

[1] MCM-42-2.4 represents a thermally bonded tri-laminate fabric consisting of a melt blow (MB) web on both sides of a 100% cotton core web with a total cotton content of 42% and a nominal weight of 2.4 oz./yd$^2$.
[2] SCM-60-3.35 represents a tri-laminate fabric consisting of a spunbond (SB) PP on the face side and MB PP on the back side with a total cotton content of 60% and a nominal weight of 3.35 oz/yd$^2$.
[3] SCS-45-2.2 represents a tri-laminate fabric consisting of a spunbond (SB) PP on the face side and back side with a total cotton content of 45.4% and a nominal weight of 2.2 oz/yd$^2$.
[4] Repellent finished laminate.

TABLE VII

PROPERTIES OF TRI-LAMINATE WEBS BEFORE AND AFTER CONSOLIDATION

| Sample No. | Basis Weight (oz. yd²) | | Air Permeability (ft³/min. ft²) | | Hydrostatic Pressure (inches) | | Oil Repellency Rating (0–8) | | Wicking Ratio (MD:CD Ratio) | | Web Thickness (mm) | | Pore Size of Consolidated Laminates µm | | |
|---|---|---|---|---|---|---|---|---|---|---|---|---|---|---|---|
| | Before | After | Before | After | Before | After | Before | After | Before | After | Before | After | Min. | Max. | Mean Flow |
| 1C | 2.4 | 2.63 | 15.7 | 18.9 | 20.3 | — | 5 | 0 | 1:75:1.25 | 1:0.375 | 0.5606 | 0.8783 | 9.043 | 28.20 | 15.19 |
| 6C | 4.5 | 3.39 | 11.0 | 13.53 | 13.2 | — | 5 | 0 | 1.5:1.25 | 1:1 | 0.7908 | 1.4928 | 6.757 | 18.14 | 10.97 |
| 7C | 2.75 | 2.58 | — | 29.76 | — | — | 5 | 0 | 1.25:1.0 | 0.75:1 | 0.6218 | 1.0078 | 8.164 | 20.48 | 12.905 |
| 9C | 3.35 | 34.07 | 20.7 | 29.23 | 10.5 | — | 5 | 0 | 1.4:1.25 | 1:1.5 | 0.7477 | 1.2990 | 6.757 | 25.20 | 12.73 |
| 10C | 4.35 | 3.39 | 20.6 | 29.06 | 11.0 | — | 5 | 0 | 1.0:1.0 | 0.75:1 | 0.7913 | 1.4675 | 7.109 | 33.51 | 11.50 |
| 11C | 2.2 | 2.23 | 212.2 | 235.50 | 4.3 | — | 5 | 0 | 1.25:1.0 | 1:0.75 | 0.5929 | 0.8233 | 42.85 | 69.19 | 51.255 |
| 1C-R* | 2.5 | 2.75 | — | 18.07 | — | 11.5 | 5 | 6 | 0:0 | 0:0 | 0.6750 | 0.7450 | 7.812 | 22.78 | 13.17 |
| 10C-R* | 4.35 | 3.45 | — | 35.50 | — | 5.5 | 8 | 8 | 0:0 | 0:0 | 1.3340 | 1.3995 | 7.988 | 46.71 | 15.89 |

— = Test not performed
* = water repellent treated

TABLE VIII

ABSORBENT CAPACITY (ml) & RETENTION CAPACITY (ml) OF TRI-LAMINATES BEFORE AND AFTER CONSOLIDATION

| Sample No. | Absorbent Capacity (100 PA)[1] | | Retention Capacity (3 kPA)[2] | | Retention Capacity (6 kPa)[3] | |
|---|---|---|---|---|---|---|
| | Before | After | Before | After | Before | After |
| 1C | 10 | 18 | 9.0 | 17.5 | 8.5 | 17.5 |
| 6C | 13 | 18 | 11.0 | 12.0 | 10.0 | 11.5 |
| 7C | — | 18 | — | 9.0 | — | 9.0 |
| 9C | 9 | 16 | 7.0 | 12.0 | 7.0 | 11.0 |
| 10C | 7 | 19 | 6.5 | 11.5 | 6.0 | 10.5 |
| 11C | 6 | 8 | 5.0 | 6.5 | 5.0 | 6.0 |
| 1C-R | — | — | — | — | — | — |
| 10C-R | — | — | — | — | — | — |

[1]Determined by subtracting the amount of liquid drained into the graduated cylinder at the end of 10 minutes from the original 100 ml dosage.
[2]Determined by subtracting the amount of liquid unabsorbed at 3 kPa pressure from the absorption capacity.
[3]Determined by subtracting the amount of liquid unabsorbed at 5 kPa pressure from the absorption capacity.
— = Test not performed was no material change in the CD breaking strength of the webs. Consolidation of the webs generally reduced the percent elongation of the webs in the MD, but greatly increased the percent elongation in the CD of the webs.

The increase in air permeability and decrease in hydrostatic pressure values of the consolidated webs over the non-consolidated webs as presented in Table VII show the improved ability of the present consolidated webs to permit the flow of vapor or gases through the thickness of the webs, hence is an indication of their enhanced breathability. This observation, taken in combination with the wicking ratio and oil repellency ratings of the webs before and after consolidation, show that the webs exhibit enhanced resistance to penetration of liquids (e.g. blood) and bacteria through the thickness of the consolidated webs. As shown in Table VIII, the enhanced absorbent capacity values of the consolidated webs over the non-consolidated webs, along with their respective retention capacities, is a measure of the ability of the consolidated webs to absorb and retain liquids within the consolidated webs, hence their ability to prevent strike-through of liquids from one surface of the webs to their opposite surfaces (i.e., the liquids are readily captured within the cellulosic core layer of the webs).

TABLE IX

ELASTIC RECOVERY AND STRENGTH TEST RESULTS OF CONSOLIDATED TRI-LAMINATES

| Sample No. | Elastic Recovery (%) From CD Strain of | | Breaking Strength (mN/tex) | | | | Elongation (%) | | | |
|---|---|---|---|---|---|---|---|---|---|---|
| | | | MD | | CD | | MD | | CD | |
| | 25% | 50% | Before | After | Before | After | Before | After | Before | After |
| 1C | 86 | 79 | 8.1 | 11.1 | 4.0 | 2.3 | 9.5 | 9.8 | 16.9 | 67.3 |
| 6C | 83 | — | 2.6 | 8.3 | 1.3 | 0.9 | 9.8 | 6.6 | 20.3 | 43.5 |
| 7C | 70 | 67 | 6.0 | 4.7 | 0.8 | 0.8 | 9.9 | 6.9 | 24.0 | 37.1 |
| 9C | 82 | — | 5.4 | 7.6 | 2.3 | 1.5 | 32.0 | 14.2 | 31.2 | 55.2 |
| 10C | 88 | 78 | 5.6 | 10.9 | 2.3 | 1.6 | 25.5 | 17.2 | 30.4 | 86.4 |
| 11C | 87 | 77 | 9.5 | 14.2 | 4.6 | 5.7 | 51.2 | 30.9 | 76.7 | 105.6 |
| 1C-R | 88 | 78 | 6.0 | 13.8 | 3.6 | 1.3 | 13.7 | 5.7 | 18.5 | 45.2 |
| 10C-R | 83 | 65 | 6.4 | 12.0 | 2.1 | 0.9 | 32.5 | 5.7 | 33.5 | 49.6 |

— = break prior to 50% elongation

From Table IX, it will be recognized that consolidation of the tri-laminates generally increased the MD breaking strength of the consolidated webs, and in most cases there From Table IX, it may also be seen that the consolidated webs exhibited good elastic recovery from CD strain, thereby making the webs of value in the manufacture of a large variety of products wherein elasticity of the webs is of some concern, such as in disposable garments for medical personnel, pillow cases, etc.

The bending lengths of the tri-laminates were generally within a range of 1–2 cm, with the tri-laminates containing one or two layers of SB generally having lower bending lengths. Likewise, trilaminates containing a SB layer appeared to have higher air permeability values. Sample IIC which contained two SB layers (SCS) had approximately ten times greater air permeability than did the MCM and SCM tri-laminates.

Visual and physical examination of the consolidated webs containing the inner layer of cellulosic fibers showed their excellent hand. Upon such examination, the webs exhibited a soft feel to the touch and did not exhibit the characteristic roughness often experienced with MB or SB webs or combinations of MB and/or SB webs. Whereas it is not known with certainty, it is believed that the consolidation of the tri-laminates having an inner core web of cotton causes the cotton fibers to assume a more random orientation, both within the plane of the web and at angles to the plane of the web, thereby causing the cotton fibers to impart an apparent bulkiness and softness to the overall web. In any event, the consolidated trilaminates exhibit a definitely enhanced hand as compared to non-consolidated tri-laminates. Further, the consolidated webs exhibit good conformability.

The presence of the cellulosic layer in the consolidated webs of the present invention also makes the present webs more environmentally desirable in that the cellulose fibers degrade relatively rapidly. In so doing, the degradation tends to promote disintegration of the polymeric components of the webs, thereby making the present webs less deleterious to the environment.

As demonstrated by the experimental data herein, the method of the present invention produces a nonwoven fabric that possesses unique and useful properties that lend the fabric to application in a variety of fields. The properties of reduced pore size and pore size distribution makes the web ideally suited for filtration and absorption. The property of CD elasticity increases the web utility in filtration (e.g., surgical masks where conformance to the face contours is important) and other uses such as flexible gowns or diapers and hygiene products. The property of strength enhances the usefulness of the consolidated web in most all applications.

What is claimed is:

1. A planar nonwoven web consolidated and elastic in the cross-direction, of a precursor nonwoven web comprising randomly deposited nonelastomeric thermoplastic fibers, uniaxially drawn and heat set, wherein the uniaxial heating and drawing are carried out by passing the precursor web into an oven at a temperature between the softening temperature and the melting point of the thermoplastic fibers at a first linear feed velocity and withdrawing the precursor web from the oven at a second linear output velocity and wherein the second velocity exceeds the first feed velocity, whereby a majority of the fibers are aligned generally in the direction of draw and a minority of segments of fibers are disposed crosswise or transversely to the direction of draw, whereby the web is longitudinally elongated and heat set with respect to the precursor and has a maximum pore size of less than 80% of that of the precursor web and a reduced pore size distribution by at least 20%.

2. A planar heat-set, permanently longitudinally elongated, laterally consolidated and elastic in the cross-direction nonwoven web which comprises randomly disposed nonelastomeric thermoplastic fibers, uniaxially drawn and heat set, wherein the uniaxial heating and drawing results from passing the precursor web through a heating zone at a temperature between the softening temperature and the melting point of the polymeric fibers of the precursor web at a first linear feed velocity and withdrawing the precursor web from the oven at a linear output velocity which exceeds the first feed velocity, in which consolidate web a majority of the fibers are aligned generally axially and a minority of segments of fibers are disposed crosswise or transversely, which web has a maximum pore size of less than 80% of that of the precursor web and has stretch capability in the cross-direction and a reduced pore size distribution by at least 20%.

3. The consolidated nonwoven web of claim 1 which has virtually no appreciable stretch in the machine direction.

4. The consolidated nonwoven web of claim 3 wherein the ratio of the difference in breaking elongation in the cross-direction between the consolidated nonwoven web and the precursor to the cross-direction breaking elongation of the precursor is at least 187%.

5. The consolidated nonwoven web of claim 3 wherein the stretch capability of the consolidated web to that of the precursor is at least 187%.

6. The consolidated nonwoven web of claim 3 wherein the consolidated web is of reduced width with respect to the precursor.

7. The consolidated nonwoven web of claim 6 wherein the ratio of the width of the consolidated web to that of the precursor is at least 1.3%.

8. The consolidated nonwoven web of claim 3 wherein the permanent elongation of the consolidated web with respect to the precursor is 5 to 200%.

9. The consolidated nonwoven web of claim 3 wherein the consolidated web can sustain an elongation to break which is about 1,400% greater than that of its precursor.

10. The consolidated nonwoven web of claim 3 wherein the ratio of the width "a" of the precursor web entering the heating zone to the width "c" of the consolidated web exiting the heating zone is at least 1.3.

11. The consolidated nonwoven web of claim 3 which has a thickness greater than that of its precursor.

12. The consolidated nonwoven web of claim 3 wherein the pore size distribution is reduced by at least 20% compared to that of the precursor web.

13. The consolidated nonwoven web of claim 3 wherein the consolidated web has at least 70% recovery from a 50% elongation in the cross-direction.

14. The consolidated nonwoven web of claim 3 wherein the consolidated web has a room temperature elongation (strain) at break between 2 and 10%, based on test method ASTM D 1117-77.

15. The consolidated nonwoven web of claim 3 wherein the precursor web has a breaking elongation less than 40% based on ASTM D 5035-90.

16. The consolidated nonwoven web of claim 3 wherein the crystallinity of the fibers of the precursor is high enough to provide a room temperature breaking elongation of less than 40% based on ASTM D5035-90.

17. The consolidated nonwoven web of claim 3 wherein the fibers of the precursor are meltblown or spunbond fibers.

18. The consolidated nonwoven web of claim 15 wherein the thermoplastic nonelastomeric fiber of the precursor is a thermoplastic fiber selected from the group consisting of polyolefin, polyester, polyamide, polyurethane, polystyrene and polycarbonate fibers.

19. The consolidated nonwoven web of claim 18 wherein the polyolefin is selected from the group consisting of polypropylene, polyethylene, and copolymers thereof.

20. The consolidated nonwoven web of claim 19 wherein the crystallinity of the fibers of the precursor is in the range of 30 to 70%.

21. A filter of the consolidated nonwoven web of claim 2.

22. The consolidated nonwoven web of claim 3 which contains an electrostatic charge.

23. The nonwoven web of claim 2 in which the fibers break at a strain of less than 40 percent in accordance with ASTM test method D5035-90.

24. The nonwoven web of claim 18 wherein the thermoplastic nonelastomeric fiber is a polyolefin fiber.

25. The nonwoven web of claim 24 in which the crystallinity of the fibers is at least 30%.

26. The nonwoven web of claim 23 wherein the nonwoven web is of meltblown fibers of an average diameter less than about 9 microns.

27. The nonwoven web of claim 23 wherein the nonwoven web is of spunbond fibers of an average diameter less than about 50 microns.

28. The nonwoven web of claim 23 wherein the nonwoven web is of a precursor of nonelastomeric fibers that do not stretch twice their original length and retract at room temperature.

* * * * *